(12) United States Patent
Wang et al.

(10) Patent No.: US 11,714,174 B2
(45) Date of Patent: Aug. 1, 2023

(54) PARAMETER CALIBRATION METHOD AND APPARATUS OF MULTI-LINE LASER RADAR, DEVICE AND READABLE MEDIUM

(71) Applicant: APOLLO INTELLIGENT DRIVING TECHNOLOGY (BEIJING) CO., LTD., Beijing (CN)

(72) Inventors: Bosheng Wang, Beijing (CN); Yuanfan Xie, Beijing (CN); Jun Wang, Beijing (CN); He Yan, Beijing (CN); Liang Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 613 days.

(21) Appl. No.: 16/117,953

(22) Filed: Aug. 30, 2018

(65) Prior Publication Data

US 2019/0086524 A1    Mar. 21, 2019

(30) Foreign Application Priority Data

Sep. 17, 2017    (CN) .......................... 201710851934.X

(51) Int. Cl.
*G01S 7/497*    (2006.01)
*G01S 17/42*    (2006.01)

(52) U.S. Cl.
CPC .............. *G01S 7/497* (2013.01); *G01S 17/42* (2013.01)

(58) Field of Classification Search
CPC ............. G01S 7/497; G01S 7/40; G01S 17/42
See application file for complete search history.

(56) References Cited

U.S. PATENT DOCUMENTS 9,297,899 B2 *    3/2016    Newman ................ G01S 17/875
9,965,870 B2 *    5/2018    Claveau ..................... G06T 7/80
(Continued)

FOREIGN PATENT DOCUMENTS

CN    105866762 A    *    8/2016
CN    106405555 A    2/2017
(Continued)

OTHER PUBLICATIONS

Alismail, H. & Browning, B. "Automatic Calibration of Spinning Actuated Lidar Internal Parameters" J Field Robotics, vol. 32, No. 5, pp. 723-747 (2015) (Year: 2015).*
(Continued)

*Primary Examiner* — Jay Hann
(74) *Attorney, Agent, or Firm* — Brooks Kushman P.C.

(57) ABSTRACT

The method comprises: creating a 3D scenario model of a calibration scenario, based on data of the calibration scenario collected by an already-calibrated 3D scanner; obtaining point cloud data collected by a to-be-calibrated multi-line laser radar at a plurality of position points in the calibration scenario respectively; aligning the point cloud data collected by the multi-line laser radar at the respective point points and point cloud data in the 3D scenario model into the same coordinate system on a principle that the respective position points are aligned with corresponding position points in the 3D scenario model; building a target function between data of points collected by the multi-line laser radar and data of matching points nearest to the points in the 3D scenario model, under the same coordinate system; calibrating the parameters of the multi-line laser radar according to the target function.

20 Claims, 5 Drawing Sheets

(56) References Cited

U.S. PATENT DOCUMENTS

| | | | |
|---|---|---|---|
| 10,120,068 B1 * | 11/2018 | Wu | G01S 7/4972 |
| 2015/0160332 A1 | 6/2015 | Sebastian et al. | |

FOREIGN PATENT DOCUMENTS

| | | |
|---|---|---|
| CN | 106872963 A | 6/2017 |
| CN | 107121064 A | 9/2017 |
| CN | 107153186 A | 9/2017 |

OTHER PUBLICATIONS

Chen, C. & Chien, H. "On-Site Sensor Recalibration of a Spinning Multi-Beam LiDAR System Using Automatically-Detected Planar Targets" Sensors, vol. 12, pp. 13736-13752 (2012) (Year: 2012).*

Muhammad, N. & Lacroix, S. "Calibration of a Rotating Multi-Beam Lidar" IEEE Int'l Conf. on Intelligent Robots & Systems, pp. 5648-5653 (2010) available at <https://ieeexplore.ieee.org/document/5651382>. (Year: 2010).*

Levinson, J. & Thrun, S. "Unsupervised Calibration for Multi-Beam Lasers" 12th Int'l Symposium on Experimental Robotics, vol. 79, pp. 179-193 (2014) (Year: 2014).*

Sheehan, M., et al. "Automatic Self-Calibration of a Full Field-of-View 3D n-Laser Scanner" 12th Int'l Symposium on Experimental Robotics, vol. 79, pp. 165-178 (2014) (Year: 2014).*

Cheng et al., "Calibration method for external parameters of vhicle-mounted Lidar", College of Opto-Electronic Science and Engineering, National University of Defense Technology, vol. 40, No. 12, Dec. 2013, pp. 89-94, 7 pages.

Hoang et al., Closed-Form Solution to 3D Points for Estimating Extrinsic Parameters of Camera and Laser Sensor, IEEE International Conference on Robotics and Automation 2014, pp. 1932-1937.

* cited by examiner

PARAMETER CALIBRATION METHOD AND APPARATUS OF MULTI-LINE LASER RADAR, DEVICE AND READABLE MEDIUM

The present application claims the priority of Chinese Patent Application No. 201710851934.X, filed on Sep. 19, 2017, with the title of "Parameter calibration method and apparatus of multi-line laser radar, device and readable medium". The disclosure of the above applications is incorporated herein by reference in its entirety.

FIELD OF THE DISCLOSURE

The present disclosure relates to the technical field of computer application, and particularly to a parameter calibration method and apparatus of a multi-line laser radar, a device and a readable medium.

BACKGROUND OF THE DISCLOSURE

In many fields such as autonomous driving, robots and surveying and mapping, multi-line laser radars are a kind of commonly-used sensor devices and used to accurately measure orientations and distance information of obstacles in the surrounding environment. However, a measurement precision of a multi-line laser radar is closely related to its own internal parameter and external parameter of relatively-mounted machines. Therefore, in the prior art, it is necessary to calibrate internal parameter and/or external parameter of the multi-line laser radar to improve the measurement precision of the multi-line laser radar.

Calibration of the multi-line laser radar in the prior art is classified into supervisory type and non-supervisory type according to whether to build a model for a scenario. According to the non-supervisory calibration technology, a simple assumption is made for a calibration scenario, i.e., assume that a surface of an object in the scenario is smooth in a scanning scope of an adjacent laser tube, then optimize consistency of point cloud scanned by neighboring beams, and meanwhile implement calibration of the internal parameter and external parameter of the multi-line laser radar. In the supervisory type calibration technology, it takes a lot of time to build a calibration scenario to achieve a better calibration precision.

However, in the current supervisory calibration technology, upon calibrating the parameters of the multi-line laser radar, a process of building the calibration scenario is very complicated, time-consuming and laborious and causes a lower parameter calibration efficiency of the multi-line laser radar.

SUMMARY OF THE DISCLOSURE

The present disclosure provides a parameter calibration method and apparatus of a multi-line laser radar, a device and a readable medium, to improve the efficiency of calibrating parameters of the laser radar.

The present disclosure provides a parameter calibration method of a multi-line laser radar, the method comprising:

creating a 3D scenario model of a calibration scenario, based on data of the calibration scenario collected by an already-calibrated 3D scanner;

obtaining point cloud data collected by a to-be-calibrated multi-line laser radar at a plurality of position points in the calibration scenario respectively;

aligning the point cloud data collected by the multi-line laser radar at the respective point points and point cloud data in the 3D scenario model into the same coordinate system on a principle that the respective position points are aligned with corresponding position points in the 3D scenario model;

building a target function between data of points collected by the multi-line laser radar and data of matching points nearest to the points in the 3D scenario model, under the same coordinate system;

calibrating the parameters of the multi-line laser radar according to the target function.

Further optionally, in the method, the aligning the point cloud data collected by the multi-line laser radar at the respective point points and point cloud data in the 3D scenario model into the same coordinate system on a principle that the respective position points are aligned with corresponding position points in the 3D scenario model specifically comprises:

aligning respective position points to corresponding positions in the 3D scenario model;

obtaining a conversion parameter at respective position points after the alignment from a coordinate system of a mounting machine mounted with the multi-line laser radar to a coordinate system of the 3D scenario model;

according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

Further optionally, in the method, the step of, according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model specifically comprises:

Taking $r_j$ as raw data at any point j in the point cloud collected by the multi-line laser radar at the $i^{th}$ position point, and calculating coordinates of the point j in the coordinate system of the mounting machine by using the equation $p_b^j = T_{b,s} L(r_j; I)$, according to the internal parameter I of the multi-line laser radar, the conversion function for converting the raw data into the multi-line laser radar coordinate system, and the conversion parameter from the coordinate system of the multi-line laser radar to the coordinate system of the mounting machine mounted with the multi-line laser radar, wherein $r_j \in R_i$, $R_i$ is a set of raw data collected by the multi-line laser radar at the $i^{th}$ position; $L(r_j; I)$ is the conversion function from the raw data to the multi-line laser radar coordinate system; $T_{b,s}$ is a set of conversion parameters from the coordinate system of the multi-line laser radar to the coordinate system of the mounting machine mounted with the multi-line laser radar, $T_{b,s} = \{T_{b,s}^i\}$, wherein $T_{b,s}^i$ is the conversion parameter from the coordinate system of the $i^{th}$ multi-line laser radar to the coordinate system of the mounting machine mounted with the multi-line laser radar; $p_b^j$ is the coordinates of the point j in the coordinate system of the mounting machine;

calculating coordinates of the point j in the coordinate system of the 3D scenario model by using equation $p_m^j =$ $T_{m,b}{}^i p_b{}^j$ according to a conversion parameter $T_{m,b}{}^i$ at the i$^{th}$ position point from the coordinate system of the mounting machine to the coordinate system of the 3D scenario model, and coordinates $p_b{}^j$ of the point j in the coordinate system of the mounting machine; wherein $p_m{}^j$ is coordinates of the point j in the coordinate system of the 3D scenario model.

Further optionally, in the method, the building a target function between data of points collected by the multi-line laser radar and data of matching points nearest to the points in the 3D scenario model, under the same coordinate system specifically comprises:

setting a weight $w(p)=f(c(p))$ and a normal direction $n(p)$ of points p in the 3D scenario model; wherein $c(p)$ is a scalar function, which measures a curve degree of a model surface adjacent to point p; function $f(\ )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtaining coordinates $m_j$ of a matching point nearest to coordinates $p_m{}^j$ of the point j in the 3D scenario model collected at the i$^{th}$ position point, and obtaining a weight $w(m_j)$ and a normal direction $n(m_j)$ of the matching point $m_j$;

building a target function using the following formula according to the coordinates $p_m{}^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,b}, T_{b,s}, I) = \Sigma_i \Sigma_j \rho(w(m_j) n^T(m_j)(m_j - p_m{}^j)), m_j \in M$$

where $E(T_{m,b}, T_{b,s}, I)$ is a target function; $\rho(\cdot)$ is a loss function; $n^T(m_j)$ is transposition of the normal direction $n(m_j)$ of the matching point $m_j$; M is a set of points in the 3D scenario model; $T_{m,b} = \{T_{m,b}{}^i\}$ and is a set of conversion parameters $T_{m,b}{}^i$ of all i position points from the coordinate system of the mounting machine to the coordinate system of the 3D scenario model.

Further optionally, in the method, the calibrating the parameters of the multi-line laser radar according to the target function specifically comprises:

optimizing a conversion parameter $T_{b,s}$ in the target function from the coordinate system of the multi-line laser radar to the coordinate system of the mounting machine mounted with the multi-line laser radar, to make the target function converge;

jointly optimizing the $T_{b,s}$ and internal parameter I in the target function to enable the target function to take a minimal value;

obtaining a value of the corresponding $T_{b,s}$ and internal parameter I when the target function takes the minimal value, respectively as the external parameter and internal parameter after calibration of the multi-line laser radar.

Further optionally, in the method, the aligning the point cloud data collected by the multi-line laser radar at the respective point points and point cloud data in the 3D scenario model into the same coordinate system on a principle that the respective position points are aligned with corresponding position points in the 3D scenario model specifically comprises:

aligning respective position points to corresponding positions in the 3D scenario model;

obtaining a conversion parameter at respective position points after alignment from a coordinate system of the multi-line laser radar mounted on the mounting machine to a coordinate system of the 3D scenario model;

according to the conversion parameter at respective position points from the coordinate system of the multi-line laser radar mounted on the mounting machine to the coordinate system of the 3D scenario model, and an internal parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

Further optionally, in the method, the step of, according to the conversion parameter at respective position points from the coordinate system of the mounted multi-line laser radar to the coordinate system of the 3D scenario model, and an internal parameter of the multi-line laser radar, converting the point cloud data collected by the multi-line laser radar at respective position points to corresponding coordinates in the 3D scenario model specifically comprises:

taking $r_j$ as raw data at any point j in the point cloud collected by the multi-line laser radar at the i$^{th}$ position point, and calculating coordinates of the point j in the coordinate system of the 3D scenario model by using the equation $p_m{}^j = T_{m,s}{}^i L(r_j; I)$, according to the internal parameter I of the multi-line laser radar, and the conversion parameter at the corresponding position point from the coordinate system of the mounted multi-line laser radar to the coordinate system of the 3D scenario model, wherein $r_j \in R_i$, $R_i$ is a set of raw data collected by the multi-line laser radar at the i$^{th}$ position; $L(r_j; I)$ is a conversion function from the raw data to the multi-line laser radar coordinate system; $T_{m,s}{}^i$ is a conversion parameter at the i$^{th}$ position point from the coordinate system of the multi-line laser radar to the coordinate system of the 3D scenario model; $p_m{}^j$ is coordinates of point j in the coordinate system of the 3D scenario model.

Further optionally, in the method, the building a target function between data of points collected by the multi-line laser radar and data of matching points nearest to the points in the 3D scenario model, under the same coordinate system specifically comprises:

setting a weight $w(p)=f(c(p))$ and a normal direction $n(p)$ of points p in the 3D scenario model, wherein $c(p)$ is a scalar function, which measures a curve degree of a model surface adjacent to point p; function $f(\ )$ is a monotone function to map$c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtaining coordinates $m_j$ of a matching point nearest to coordinates $p_m{}^j$ of the point j in the 3D scenario model collected at the i$^{th}$ position point, and obtain a weight $w(m_j)$ and a normal direction $n(m_j)$ of the matching point $m_j$;

building a target function using the following formula according to the coordinates $p_m{}^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,s}, I) = \Sigma_i \Sigma_j \rho(w(m_j) n^T(m_j)(m_j - p_m{}^j)), m_j \in M$$

where $E(T_{m,s}, I)$ is a target function; $\rho(\cdot)$ is a loss function; $n^T(m_j)$ is transposition of the normal direction $n(m_j)$ of the matching point $m_j$; M is a set of points in the 3D scenario model, $T_{m,s} = \{T_{m,s}{}^i\}$ is a set of conversion parameters at all i position points from the coordinate system of the mounted multi-line laser radar to the coordinate system of the 3D scenario model.

Further optionally, in the method, the calibrating the parameters of the multi-line laser radar according to the target function specifically comprises:

optimizing a conversion parameter $T_{m,s}$ in the target function from the coordinate system of the multi-line laser radar to the coordinate system of the 3D scenario model, to make the target function converge;

re-optimizing the internal parameter I in the target function to enable the target function to take a minimal value;

obtaining values of corresponding $T_{b,s}$ and internal parameter I when the target function takes the minimal value, as the internal parameter after calibration of the multi-line laser radar.

The present disclosure provides a parameter calibration apparatus of a multi-line laser radar, the apparatus comprising:

a model creating module configured to create a 3D scenario model of a calibration scenario, based on data of the calibration scenario collected by an already-calibrated 3D scanner;

an obtaining module configured to obtain point cloud data collected by a to-be-calibrated multi-line laser radar at a plurality of position points in the calibration scenario respectively;

an alignment processing module configured to align the point cloud data collected by the multi-line laser radar at the respective point points and point cloud data in the 3D scenario model into the same coordinate system on a principle that the respective position points are aligned with corresponding position points in the 3D scenario model;

a function building module configured to build a target function between data of points collected by the multi-line laser radar and data of matching points nearest to the points in the 3D scenario model, under the same coordinate system;

a calibration module configured to calibrate the parameters of the multi-line laser radar according to the target function.

Further optionally, in the apparatus, the alignment processing module is specifically configured to:

align respective position points to corresponding positions in the 3D scenario model;

obtain a conversion parameter at respective position points after the alignment from a coordinate system of a mounting machine mounted with the multi-line laser radar to a coordinate system of the 3D scenario model;

according to the conversion parameter at respective position points from the coordinate system of the mounting machine mounted with the multi-line laser radar to the coordinate system of the 3D scenario model, and an internal parameter and an external parameter of the multi-line laser radar, convert the point cloud data collected by the multi-line laser radar at respective position points to corresponding coordinates in the 3D scenario model, so that the point cloud data collected at respective position points and the 3D scenario model belong to the same coordinate system.

Further optionally, in the apparatus, the alignment processing module is specifically configured to:

take $r_j$ as raw data at any point j in the point cloud collected by the multi-line laser radar at the $i^{th}$ position point, and calculate coordinates of the point j in the coordinate system of the mounting machine by using the equation $p_b^j = T_{b,s} L(r_j; I)$, according to the internal parameter I of the multi-line laser radar, the conversion function for converting the raw data into the multi-line laser radar coordinate system, and the conversion parameter from the coordinate system of the multi-line laser radar to the coordinate system of the mounting machine mounted with the multi-line laser radar, wherein $r_j \in R_i$, $R_i$ is a set of raw data collected by the multi-line laser radar at the $i^{th}$ position; $L(r_j; I)$ is the conversion function from the raw data to the multi-line laser radar coordinate system; $T_{b,s}$ is a set of conversion parameters from the coordinate system of the multi-line laser radar to the coordinate system of the mounting machine mounted with the multi-line laser radar, $T_{b,s} = \{T_{b,s}^i\}$, wherein $T_{b,s}^i$ is the conversion parameter from the coordinate system of the $i^{th}$ multi-line laser radar to the coordinate system of the mounting machine mounted with the multi-line laser radar; $p_b^j$ is the coordinates of the point j in the coordinate system of the mounting machine;

calculate coordinates of the point j in the coordinate system of the 3D scenario model by using equation $p_m^j = T_{m,b}^i p_b^j$ according to a conversion parameter $T_{m,b}$ at the $i^{th}$ position point from the coordinate system of the mounting machine to the coordinate system of the 3D scenario model, and coordinates $p_b^j$ of the point j in the coordinate system of the mounting machine; wherein $p_m^j$ is coordinates of the point j in the coordinate system of the 3D scenario model.

Further optionally, in the apparatus, the function building module is specifically configured to:

set a weight $w(p) = f(c(p))$ and a normal direction $n(p)$ of points p in the 3D scenario model; wherein $c(p)$ is a scalar function, which measures a curve degree of a model surface adjacent to point p; function $f(\ )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtain coordinates $m_j$ of a matching point nearest to coordinates $p_m^j$ of the point j in the 3D scenario model collected at the $i^{th}$ position point, and obtain a weight $w(m_j)$ and a normal direction $n(m_j)$ of the matching point $m_j$;

build a target function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,b}, T_{b,s}, I) = \Sigma_i \Sigma_j \rho(w(m_j) n^T(m_j)(m_j - p_m^j)), m_j \in M$$

where $E(T_{m,b}, T_{b,s}, I)$ is a target function; $\rho(\cdot)$ is a loss function; $n^T(m_j)$ is transposition of the normal direction $n(m_j)$ of the matching point $m_j$; M is a set of points in the 3D scenario model; $T_{m,b} = \{T_{m,b}^i\}$ and is a set of conversion parameters $T_{m,b}^i$ of all i position points from the coordinate system of the mounting machine to the coordinate system of the 3D scenario model.

Further optionally, in the apparatus, the calibration module is specifically configured to:

optimize a conversion parameter $T_{b,s}$ in the target function from the coordinate system of the multi-line laser radar to the coordinate system of the mounting machine mounted with the multi-line laser radar, to make the target function converge;

jointly optimize the $T_{b,s}$ and internal parameter I in the target function to enable the target function to take a minimal value;

obtain a value of the corresponding $T_{b,s}$ and internal parameter I when the target function takes the minimal value, respectively as the external parameter and internal parameter after calibration of the multi-line laser radar.

Further optionally, in the apparatus, the alignment processing module is specifically configured to:

align respective position points to corresponding positions in the 3D scenario model;

obtain a conversion parameter at respective position points after alignment from a coordinate system of the multi-line laser radar mounted on the mounting machine to a coordinate system of the 3D scenario model;

according to the conversion parameter at respective position points from the coordinate system of the multi-line laser radar mounted on the mounting machine to the coordinate system of the 3D scenario model, and an internal parameter of the multi-line laser radar, convert the point cloud data collected by the multi-line laser radar at respective position points to corresponding coordinates in the 3D scenario model, so that the point cloud data collected at respective position points and the 3D scenario model belong to the same coordinate system.

Further optionally, in the apparatus, the alignment processing module is specifically configured to:

take $r_j$ as raw data at any point j in the point cloud collected by the multi-line laser radar at the $i^{th}$ position point, and calculate coordinates of the point j in the coordinate system of the 3D scenario model by using the equation $p_m^j = T_{m,s}^i L(r_j; I)$, according to the internal parameter I of the multi-line laser radar, and the conversion parameter at the corresponding position point from the coordinate system of the mounted multi-line laser radar to the coordinate system of the 3D scenario model, wherein $r_j \in R_i$, $R_i$ is a set of raw data collected by the multi-line laser radar at the $i^{th}$ position; $L(r_j; I)$ is a conversion function from the raw data to the multi-line laser radar coordinate system; $T_{m,s}^i$ is a conversion parameter at the $i^{th}$ position point from the coordinate system of the multi-line laser radar to the coordinate system of the 3D scenario model; $p_m^j$ is coordinates of point j in the coordinate system of the 3D scenario model.

Further optionally, in the apparatus, the function building module is specifically configured to:

set a weight $w(p)=f(c(p))$ and a normal direction $n(p)$ of points p in the 3D scenario model, wherein $c(p)$ is a scalar function, which measures a curve degree of a model surface adjacent to point p; function $f( )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtain coordinates $m_j$ of a matching point nearest to coordinates $p_m^j$ of the point j in the 3D scenario model collected at the $i^{th}$ position point, and obtain a weight $w(m_j)$ and a normal direction $n(m_j)$ of the matching point $m_j$;

build a target function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,s}, I) = \Sigma_i \Sigma_j \rho(w(m_j) n^T(m_j)(m_j - p_m^j)), m_j \in M$$

where $E(T_{m,s}, I)$ is a target function; $\rho(\cdot)$ is a loss function; $n^T(m_j)$ is transposition of the normal direction $n(m_j)$ of the matching point $m_j$; M is a set of points in the 3D scenario model, $T_{m,s} = \{T_{m,s}^i\}$ is a set of conversion parameters at all i position points from the coordinate system of the mounted multi-line laser radar to the coordinate system of the 3D scenario model.

Further optionally, in the apparatus, the calibration module is specifically configured to:

optimize a conversion parameter $T_{m,s}$ in the target function from the coordinate system of the multi-line laser radar to the coordinate system of the 3D scenario model, to make the target function converge;

re-optimize the internal parameter I in the target function to enable the target function to take a minimal value;

obtain values of corresponding $T_{b,s}$ and internal parameter I when the target function takes the minimal value, as the internal parameter after calibration of the multi-line laser radar.

The present disclosure further provides a computer device, comprising:

one or more processors, a storage for storing one or more programs, a multi-line laser radar is configured to collect point cloud data at a plurality of position points in the calibration scenario; the 3D scanner and the multi-line laser radar are respectively communicatively connected with the processor to transmit the collected data to the processor;

the one or more programs, when executed by said one or more processors, enable said one or more processors to implement the abovementioned parameter calibration method of the multi-level laser radar.

The present disclosure further provides a computer readable medium on which a computer program is stored, the program, when executed by a processor, implementing the abovementioned parameter calibration method of the multi-level laser radar.

According to the parameter calibration method and apparatus of the multi-line laser radar, the device and the readable medium of the present disclosure, it is feasible to create the 3D scenario model of the calibration scenario, based on data of the calibration scenario collected by an already-calibrated 3D scanner; obtain point cloud data collected by the to-be-calibrated multi-line laser radar at a plurality of position points in the calibration scenario respectively; align the point cloud data collected by the multi-line laser radar at the respective point points and the point cloud data in the 3D scenario model into the same coordinate system on a principle that the respective position points are aligned with corresponding position points in the 3D scenario model; build a target function between data of points collected by the multi-line laser radar and data of matching points nearest to the points in the 3D scenario model, under the same coordinate system; calibrate the parameters of the multi-line laser radar according to the target function. As compared with the prior art, in the technical solution of the present embodiment, a complicated calibration scenario needn't be built, calibration of parameters of the multi-line laser radar can be achieved by randomly selecting a calibration scenario, thereby effectively improving the efficiency of calibrating parameters of the multi-line laser radar. Furthermore, the parameter calibration method of the multi-line laser radar of the present embodiment can effectively improve the precision of calibrating parameters of the multi-line laser radar, as compared with the current non-supervisory type calibration technology.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
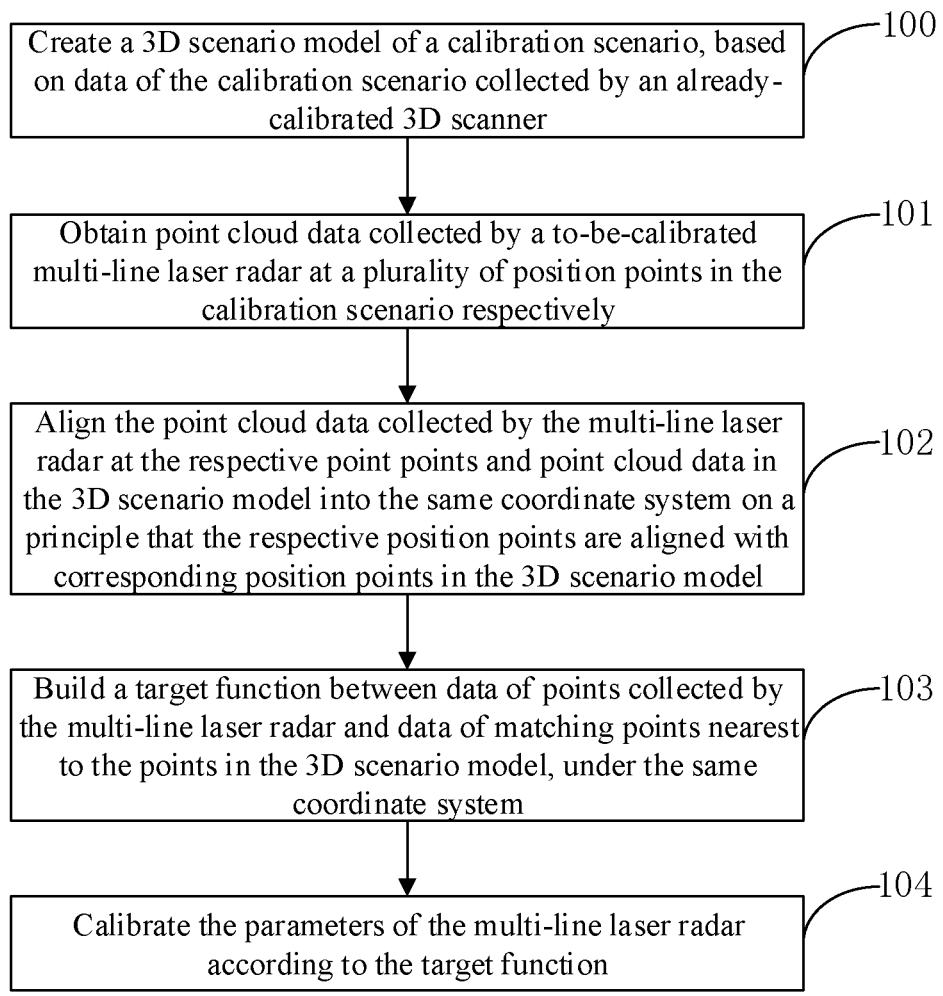
FIG. 1 is a flow chart of Embodiment 1 of a parameter calibration method of a multi-line laser radar according to the present disclosure.

FIG. 1 is a flow chart of Embodiment 1 of a parameter calibration method of a multi-line laser radar according to the present disclosure. As shown in FIG. 1, the parameter calibration method of a multi-line laser radar according to the present embodiment may specifically include the following steps:

100: creating a 3D scenario model of a calibration scenario, based on data of the calibration scenario collected by an already-calibrated 3D scanner;

A subject for executing the parameter calibration method of the multi-line laser radar according to the present embodiment may be a parameter calibration apparatus of the multi-line laser radar, and the parameter calibration apparatus of the multi-line laser radar may be an entity apparatus.

In the present embodiment, since parameters of the multi-line laser radar need to be calibrated, a precision of the 3D scanner used to collect the data of the calibration scenario must be larger than the precision of the to-be-calibrated multi-line laser radar. Therefore, the 3D scanner in the present embodiment is called an already-calibrated 3D scanner to indicate that the D scanner has a higher precision.

In the calibration scenario, the 3D scanner cannot obtain the data of the calibration scenario, namely, 3D geometrical information by scanning one time at one position point. Therefore, it is possible to select a plurality of position points in the 3D scenario to collect respectively, and restore the 3D scenario model of the whole calibration scenario according to 3D geometrical information collected according to the plurality of position points. Specifically, it is possible to first select a plurality of position points in the calibration scenario, then control the 3D scanner to scan data of the 3D scenario of the calibration scenario, namely, 3D geometrical information at respective position points, then obtain the data of the 3D scenario scanned by the 3D scanner at the plurality of position points in the calibration scenario; join the data of the 3D scenario obtained by scanning at respective position points, to obtain the 3D scenario model. Data at points in the 3D scenario model are 3D geometrical information or 3D coordinates, and serve as standard data for reference upon calibration.

It needs to be appreciated that the data of the calibration scenario obtained by scanning of the 3D scanner may be expression of structural information in any form, and not limited to use of expression manners such as point cloud or a mesh model.

101: obtaining point cloud data collected by a to-be-calibrated multi-line laser radar at a plurality of position points in the calibration scenario respectively;

In the present embodiment, when the to-be-calibrated multi-line laser radar is used to collect point cloud data in the calibration scenario, to make an optimization result more accurate and prevent happening of overfitting phenomenon, it is also necessary to select a plurality of position points in the calibration scenario, and control the multi-line laser radar to collect point cloud data in the calibration scenario at a plurality of position points respectively. Specifically, upon collection, it is feasible to mount the multi-line laser radar on a mounting machine, and then locate the mounting machine at respective collection position points, and control the multi-line laser radar on the mounting machine to collect point cloud data in the calibration scenario.

In addition, it needs to be appreciated that the plurality of position points used upon using the to-be-calibrated multi-line laser radar to collect the point cloud data in the calibration scenario may be identical with or different from the plurality of position points used upon using the 3D scanner to collect the point cloud data in the calibration scenario, and is not limited here.

102: aligning the point cloud data collected by the multi-line laser radar at the respective point points and the point cloud data in the 3D scenario model into the same coordinate system on a principle that the respective position points are aligned with corresponding position points in the 3D scenario model;

Specifically, in the present embodiment, when the multi-line laser radar collects the point cloud data at respective position points, initially collected data are raw data, and then the raw data may be transformed to under the coordinate system of the mounting machine mounted with the multi-line laser radar, or may be further transformed to under the coordinate system of the 3D scenario model. That is to say, the same collected data have different expressions under different coordinate systems. Although the multi-line laser radar might be at a different height at the same position point relative to the mounting machine, no matter under which coordinate system, the position point where the mounting machine lies does not change and is the same geographical position point. In the present embodiment, it is possible to align the point cloud data collected at the respective point points and the point cloud data in the 3D scenario model into the same coordinate system on a principle that the respective position points are aligned with corresponding position points in the 3D scenario model. In the present embodiment, it is not limited that the alignment is made into the coordinate system of the 3D scenario model, or the coordinate system of the mounting machine or the coordinate system of the multi-line laser radar, or other coordinate systems other than the foregoing coordinate systems, so long as it can be ensured that the point cloud data collected by the multi-line laser radar and the point cloud data in the 3D scenario model are aligned into the same coordinate system on a principle that the respective position points collected by the multi-line laser radar are aligned with corresponding position points in the 3D scenario model. It needs to be appreciated that in the alignment processing manner, the respective position points collected by the multi-line laser radar are aligned with, namely, overlap with corresponding position points in the 3D scenario model. However, aligning the point cloud data collected by the multi-line laser radar at the respective point points and the point cloud data in the 3D scenario model means alignment of the coordinate system, and cannot certainly achieve point-to-point overlapping.

103: building a target function between data of points collected by the multi-line laser radar and data of matching points nearest to the points in the 3D scenario model, under the same coordinate system;

In the above step, the data of points collected by the multi-line laser radar at respective position points and the data of points in the 3D scenario model are aligned to under the same coordinate system. As such, it is possible in the same coordinate system that regarding each point collected by the multi-line laser radar at respective position points, a matching point nearest to the point can be obtained in the 3D scenario model. Since the calibration scenario collected by the multi-line laser radar and the calibration scenario corresponding to the 3D scenario model are the same scenario, ideally, pointes collected at respective position points should also align with the corresponding points in the 3D scenario model after the respective position points collected by the multi-line laser radar are absolutely aligned with the corresponding position points in the 3D scenario model. However, in the present embodiment, since the multi-line laser radar does not have a high precision, points collected by the multi-line laser radar do not completely overlap with the corresponding matching points of the 3D scenario model under the same coordinate system, but have a small distance difference. In the present embodiment, it is feasible to build a target function between data of points collected by the multi-line laser radar and data of matching points nearest to the points in the 3D scenario model, under the same coordinate system.

In the above step 102, in a process of aligning the point cloud data collected by the multi-line laser radar at the respective point points and the point cloud data in the 3D scenario model into the same coordinate system, it is possible to perform coordinate conversion according to parameters of the multi-line laser radar such as internal parameter and/external parameter. Therefore, a target function between data of points collected by the multi-line laser radar and data of matching points nearest to the points in the 3D scenario model, under the same coordinate system carries the parameters of the multi-line laser radar.

104: calibrating the parameters of the multi-line laser radar according to the target function.

In the present embodiment, it can be known that the target function carries parameters of the multi-line laser radar. In the present embodiment, the target function may be used to calibrate the parameters of the multi-line laser radar. A calibration manner may specifically be adjusting the parameters of the multi-line laser radar in the target function to enable the target function to take a minimum value, whereupon the data of points collected by the multi-line laser radar are sufficiently close to the matching points nearest to the points in the 3D scenario model. It may be believed that calibration of the multi-line laser radar at this time completes so that the parameters of the multi-line laser radar corresponding to a minimum value of the target function may be taken as parameters after calibration.

According to the parameter calibration method of the multi-line laser radar, it is possible to create the 3D scenario model of the calibration scenario, based on data of the calibration scenario collected by an already-calibrated 3D scanner; obtain point cloud data collected by the to-be-calibrated multi-line laser radar at a plurality of position points in the calibration scenario respectively; align the point cloud data collected by the multi-line laser radar at the respective point points and the point cloud data in the 3D scenario model into the same coordinate system on a principle that the respective position points are aligned with corresponding position points in the 3D scenario model; build a target function between data of points collected by the multi-line laser radar and data of matching points nearest to the points in the 3D scenario model, under the same coordinate system; calibrate the parameters of the multi-line laser radar according to the target function. As compared with the prior art, in the technical solution of the present embodiment, a complicated calibration scenario needn't be built, calibration of parameters of the multi-line laser radar can be achieved by randomly selecting a calibration scenario, thereby effectively improving the efficiency of calibrating parameters of the multi-line laser radar.

Regarding the current non-supervisory type calibration technology, since what is optimized is consistency of adjacent beams, to achieve precise internal parameter, it is usually necessary to provide for a travel trajectory of the mounting machine, for example, a circle with a suitable radius or the number "8". Furthermore, to obtain an accurate mounting height (namely, external parameter), it is necessary to calibrate on a road with a certain slope. On an occasion with a higher requirement for the precision of the mounting height, it is necessary to manually build or select a specific scenario, so that the current non-supervisory type calibration has a lower precision. However, according to the parameter calibration method of the multi-line laser radar of the present embodiment, the 3D scenario model of the calibration scenario is created by using the data of the calibration scenario collected by the already-calibrated 3D scanner, to achieve the calibration of the multi-line laser radar. Since the already-calibrated 3D scanner has a higher precision, calibration of the parameters of the multi-line laser radar by using the technical solution of the present embodiment exhibits a higher precision.

Figure 2:
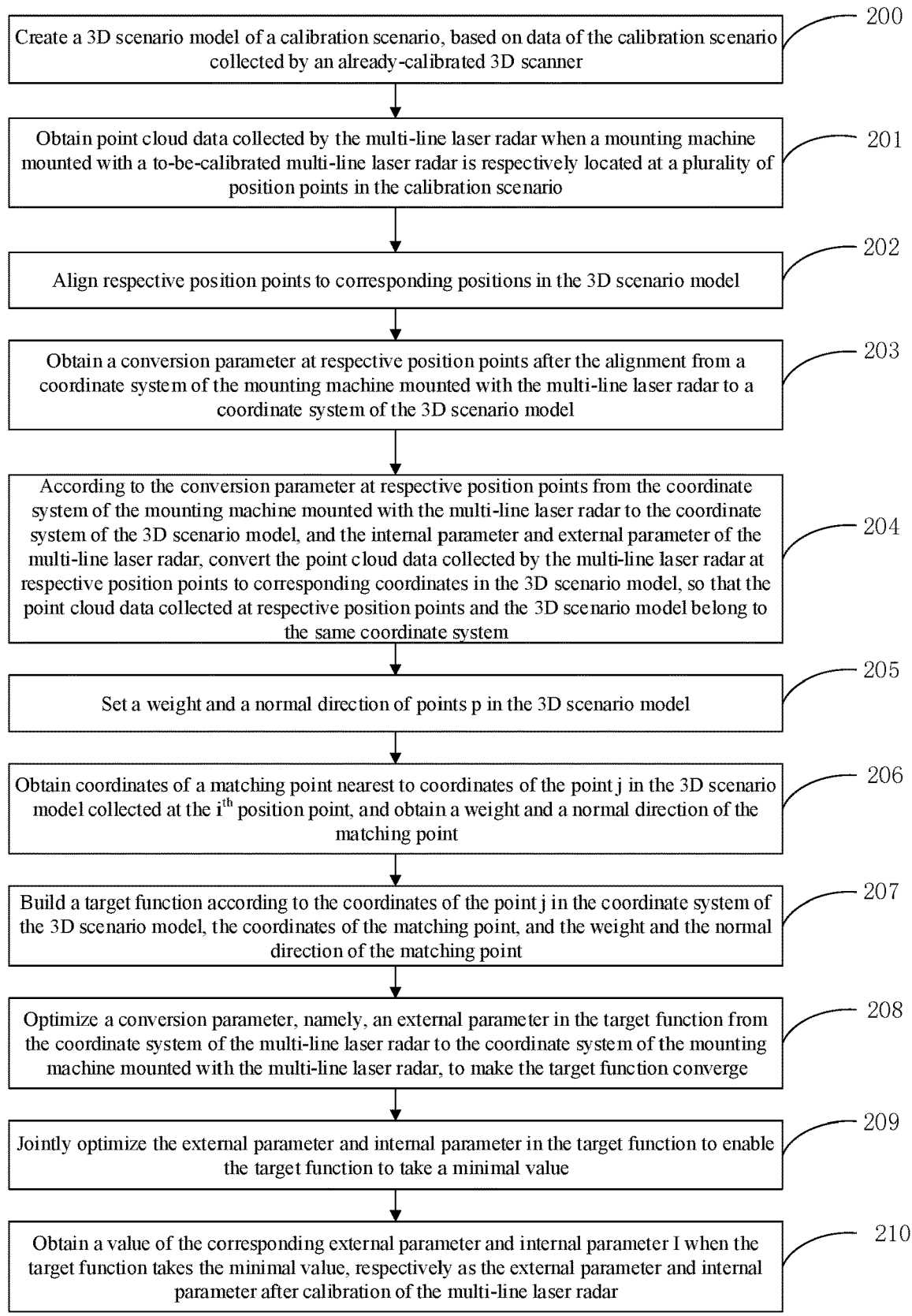
FIG. 2 is a flow chart of Embodiment 2 of a parameter calibration method of a multi-line laser radar according to the present disclosure.

FIG. 2 is a flow chart of Embodiment 2 of a parameter calibration method of a multi-line laser radar according to the present disclosure. The parameter calibration method of the multi-line laser radar according to the present embodiment further introduces the technical solution of the present disclosure in more detail on the basis of the technical solution of the embodiment shown in FIG. 1. As shown in FIG. 2, the parameter calibration method of the multi-line laser radar of the present embodiment may specifically comprise the following steps:

200: creating a 3D scenario model of a calibration scenario, based on data of the calibration scenario collected by an already-calibrated 3D scanner;

201: obtaining point cloud data collected by the multi-line laser radar when a mounting machine mounted with a to-be-calibrated multi-line laser radar is respectively located at a plurality of position points in the calibration scenario;

The step 200 of the present embodiment is implemented in the same way as step 100 of the embodiment shown in FIG. 1. For particulars, please refer to relevant depictions of the embodiment shown in FIG. 1 and detailed depictions are not prevented any more here.

In the present embodiment, if the plurality of position points are represented respectively using the world coordinate system of longitude coordinate and latitude coordinate, the multi-line laser radar is located on the mounting machine and also has a certain height coordinate. Therefore, more precisely speaking, it may be believed that the mounting machine mounted with the multi-line laser radar is located at each position point, and the multi-line laser radar is located at a certain height above the corresponding position point where the mounting machine is located. In practical application, the mounting machine mounted with the multi-line laser radar may be located at position points respectively, and the mounted multi-line laser radar collects the point cloud data in the calibration scenario.

202: aligning respective position points to corresponding positions in the 3D scenario model;

203: obtaining a conversion parameter at respective position points after the alignment from a coordinate system of the mounting machine mounted with the multi-line laser radar to a coordinate system of the 3D scenario model;

204: according to the conversion parameter at respective position points from the coordinate system of the mounting machine mounted with the multi-line laser radar to the coordinate system of the 3D scenario model, and the internal parameter and external parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system;

Steps 202-204 of the present embodiment are a specific implementation mode of step 102 of the embodiment shown in FIG. 1. The present embodiment takes an example in which coordinates of the point cloud data collected by the multi-line laser radar at respective position points are converted to the coordinate system of the 3D scenario model, so that the point cloud data collected at respective position points and the 3D scenario model belong to the same coordinate system.

In the present embodiment, an alignment manner of aligning respective position points to corresponding positions in the 3D scenario model is an absolute precise alignment, for example, respective position points are aligned with corresponding positions in the 3D scenario model by using a Global Navigation Satellite System (GNSS). Specifically, it is possible to detect, through the GNSS, the world coordinates of position points where the mounting machine mounted with the multi-line laser radar lies, and obtain, from the 3D scenario model, positions corresponding to the world coordinates of the respective position points. Therefore, it is possible to align the respective position points to corresponding positions in the 3D scenario model.

Or optionally, it is also possible to use the GNSS to calculate relative posture transformation parameters, namely, coordinate transformation parameters of the mounting machine at the plurality of position points, first join point cloud data collected at the plurality of position points to obtain a complete 3D model detected by the multi-line laser radar in the calibration scenario, and finally align the two by using a model registration technology such as surface registration or a manual method.

In the present embodiment, the external parameter of the multi-line laser radar may be a conversion parameter from the coordinate system of the multi-line laser radar to the coordinate system of the mounting machine, for example, represented by $T_{b,s}$ in the present embodiment. In the present embodiment, the internal parameter of the multi-line laser radar is represented by I. An initial value of the external parameter of the multi-line laser radar may be pre-obtained according to the corresponding coordinate system of the multi-line laser radar and coordinate system of the mounting machine. An initial value of the internal parameter of the multi-line laser radar depends on the multi-line laser radar itself.

The conversion parameter from the coordinate system of the mounting machine mounted with the multi-line laser radar at respective position points after the alignment to the coordinate system of the 3D scenario model for example may be determined according to an actual position of an origin of ordinate of the mounting machine at each position point, an actual position of an origin of coordinate of the coordinate system of the 3D scenario model, and an orientation of each coordinate axis of the coordinate system of the mounting machine at each position point, and an orientation of each coordinate axis of the coordinate system of the 3D scenario model.

For example, step 204 may specifically comprise: taking $r_j$ as raw data at any point j in the point cloud collected by the multi-line laser radar at the $i^{th}$ position point, namely, the raw data at any point j in the point cloud collected by the mounted multi-line laser radar is $r_j$ when the mounting machine mounted with the multi-line laser radar is at the $i^{th}$ position point.

Then, calculating coordinates of the point j in the coordinate system of the mounting machine by using the equation $p_b^j = T_{b,s} L(r_j; I)$, according to the internal parameter I of the multi-line laser radar, the conversion function for converting the raw data into the multi-line laser radar coordinate system, and the conversion parameter from the coordinate system of the multi-line laser radar to the coordinate system of the mounting machine mounted with the multi-line laser radar, wherein $r_j \in R_i$, $R_i$ is a set of raw data collected by the multi-line laser radar at the $i^{th}$ position; $L(r_j; I)$ is the conversion function from the raw data to the multi-line laser radar coordinate system; $T_{b,s}$ is a set of conversion parameters from the coordinate system of the multi-line laser radar to the coordinate system of the mounting machine mounted with the multi-line laser radar, $T_{b,s} = \{T_{b,s}^i\}$, wherein $T_{b,s}^i$ is the conversion parameter from the coordinate system of the $i^{th}$ multi-line laser radar to the coordinate system of the mounting machine mounted with the multi-line laser radar; $p_b^j$ is the coordinates of the point j in the coordinate system of the mounting machine; this step achieves converting the coordinate system in which the raw data at any point j in the point cloud collected at the $i^{th}$ position point is $r_j$ into the multi-line laser radar coordinate system, and then finally converting to the coordinate system of the mounting machine.

Then, calculating coordinates of the point j in the coordinate system of the 3D scenario model by using equation $p_m^j = T_{m,b}^i p_b^j$ according to a conversion parameter $T_{m,b}^i$ at the $i^{th}$ position point from the coordinate system of the mounting machine to the coordinate system of the 3D scenario model, and coordinates $p_b^j$ of the point j in the coordinate system of the mounting machine; wherein $p_m^j$, is coordinates of the point j in the coordinate system of the 3D scenario model. This step achieves converting the coordinates of any point j in the point cloud collected by the multi-line laser radar at the $i^{th}$ position point from the coordinate system of the mounting machine to the coordinate system of the 3D scenario model. The above processing can achieve that the point cloud data collected by the multi-line laser radar at position points and the 3D scenario model belong to the same coordinate system.

205: setting a weight $w(p)=f(c(p))$ and a normal direction $n(p)$ of points p in the 3D scenario model;

In the present embodiment, $c(p)$ is a scalar function, which measures a curve degree of a model surface adjacent to point p; $f( )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p.

In the present embodiment, the built target function is a function relationship between data of points collected by the multi-line laser radar and the data of matching points nearest to the points in the 3D scenario model. Specifically, in the function relationship, the establishment of the function relationship is achieved mainly according to weights of points and data of the normal direction. Hence, first it is necessary to obtain the weights and normal directions of points in the 3D scenario model. In the present embodiment, the weights are defined according to a completeness degree of an area of a surface adjacent to points in the 3D scenario model, for example, regarding any point p in the 3D scenario model, the scalar function c(p) is used to measure a curve degree of the model surface adjacent to the point p; f(c(p)) maps c(p) to between 0 and 1 according to a magnitude of the curve degree of c(p); a value of w(p) is closer to 1 in a flatter region of the surface adjacent to the point p measured by c(p), otherwise the value of w(p) is closer to 0 in a more curved region of the surface adjacent to the point p measured by c(p); n(p) is the normal direction of the point p. The normal direction is a direction perpendicular to a tangent plane where the point p lies. Reference may be made to relevant prior art for details.

206: obtaining coordinates $m_j$ of a matching point nearest to coordinates $p_m^j$ of the point j in the 3D scenario model collected at the $i^{th}$ position point, and obtaining a weight $w(m_j)$ and a normal direction $n(m_j)$ of the matching point $m_j$;

After the processing of the above step, coordinates of points in the point cloud data collected by the multi-line laser radar at respective position points are all mapped into the coordinate system of the 3D scenario model. As such, in the 3D scenario model, it is possible to obtain the matching point $m_j$ of the point j collected by the multi-line laser radar at the $i^{th}$ position point. A specific obtaining process is obtaining the coordinate $m_j$ of a point nearest to the coordinate $p_m^j$ of the point j in the 3D scenario model as the coordinate of the matching point, thereby obtaining the matching point $m_j$. The weight and normal direction of each point in the 3D scenario model are already obtained according to the above step 205. As such, it is possible to obtain therefrom the weight $w(m_j)$ and the normal direction $n(m_j)$ of the matching point $m_j$.

207: building a target function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,b}, T_{b,s}, I) = \Sigma_i \Sigma_j \rho(w(m_j) n^T(m_j)(m_j - p_m^j)), m_j \in M$$

where $E(T_{m,b}, T_{b,s}, I)$ is a target function; $\rho(\cdot)$ is a loss function and used to suppress impact caused by abnormal data on a process of optimizing parameters upon calibration; $n^T(m_j)$ is transposition of the normal direction $n(m_j)$ of the matching point $m_j$; M is a set of points in the 3D scenario model. Wherein $T_{m,b} = \{T_{m,b}^i\}$ and is a set of conversion parameters $T_{m,b}^i$ of all i position points from the coordinate system of the mounting machine to the coordinate system of the 3D scenario model. $p_m^j$ is obtained with reference to the above equation $p_m^j = T_{m,b}^i p_b^j$, and $p_b^j$ may be obtained with reference to the above equation $p_b^j = T_{b,s} L(r_j; I)$ as stated in step 204. No detailed description is presented any more here.

Steps 205-207 in the present embodiment are a specific implementation mode of building the target function in step 103 of the embodiment shown in FIG. 1. The target function in the present embodiment uses the weight and normal direction of the matching point $m_j$ in the 3D scenario model, and specifically defines a corresponding weight according to the surface curve degree of the matching point $m_j$ in the 3D scenario model, to make the optimized target parameter for subsequent calibration more smooth, improve the calibration precision, and quicken the convergence speed of the target function.

208: optimizing a conversion parameter, namely, an external parameter $T_{b,s}$, in the target function from the coordinate system of the multi-line laser radar to the coordinate system of the mounting machine mounted with the multi-line laser radar, to make the target function converge;

209: jointly optimizing the external parameter $T_{b,s}$ and internal parameter I in the target function to enable the target function to take a minimal value;

210: obtaining a value of the corresponding external parameter $T_{b,s}$ and internal parameter I when the target function takes the minimal value, respectively as the external parameter and internal parameter after calibration of the multi-line laser radar.

Steps 208-210 of the present embodiment are a specific implementation mode of calibrating parameters of the multi-line laser radar in 104 of the embodiment shown in FIG. 1.

In the above embodiment, after the target function is built, it can be seen that in the target function, $E(T_{m,b}, T_{b,s}, I)$ is about the external parameter $T_{b,s}$ of the multi-line laser radar, the conversion parameter $T_{m,b}$ from the coordinate system of the mounting machine to the coordinate system of the 3D scenario model, and the internal parameter I of the multi-line laser radar. In the present embodiment, it may be believed that an initial value of $T_{m,b}$ in the target function is a real value, and upon optimization, only the external parameter $T_{b,s}$ and internal parameter I of the multi-line laser radar may be optimized.

Upon specific optimization, the internal parameter I of the multi-line laser radar may take an initial value first, and the external parameter $T_{b,s}$ of the multi-line laser radar is adjusted to optimize the external parameter $T_{b,s}$, to make the target function converge. The external parameter $T_{b,s}$ when the target function $E(T_{m,b}, T_{b,s}, I)$ converges is an optimal value corresponding to the external parameter $T_{b,s}$. For example, this may be implemented specifically by a grid search method. Then, further jointly optimize the external parameter $T_{b,s}$ and internal parameter I. That is to say, if after the internal parameter I is adjusted, in combination with the optimal value of the external parameter $T_{b,s}$ obtained previously, the target function does not converge to the minimal value, whereupon it is further possible to further adjust the external parameter $T_{b,s}$, and meanwhile adjust the internal parameter I so that the target function converges and takes a minimal value. Finally, it is possible to obtain values of the external parameter $T_{b,s}$ and internal parameter I when the target function takes the minimal value, respectively as the external parameter and internal parameter after calibration of the multi-line laser radar. For example, specifically, it is possible to implement the joint optimization of the external parameter $T_{b,s}$ and internal parameter I by using an iterative optimization technology.

The target function of the present embodiment sufficiently uses geometrical information of points of the 3D scenario model, is not limited to a result of a plane, and may effectively reduce requirements for the calibration scenario.

According to the parameter calibration method of the multi-line laser radar of the present embodiment, as compared with the prior art, in the above technical solution, a complicated calibration scenario needn't be built, calibration of parameters of the multi-line laser radar can be achieved by randomly selecting a calibration scenario, thereby effectively improving the efficiency of calibrating parameters of the multi-line laser radar. Furthermore, the parameter calibration method of the multi-line laser radar of the present embodiment can effectively improve the precision of calibrating parameters of the multi-line laser radar, as compared with the current non-supervisory type calibration technology.

Figure 3:
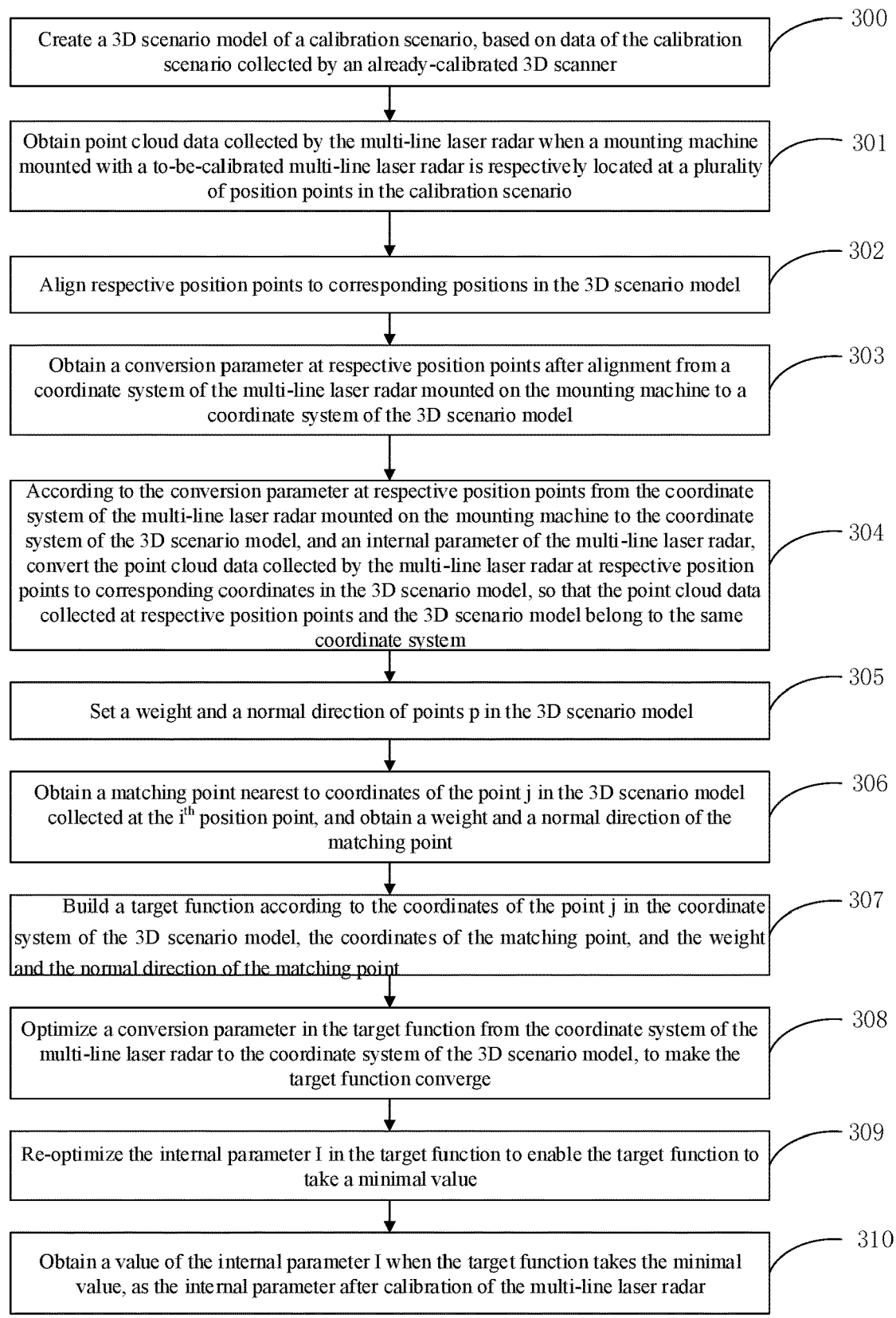
FIG. 3 is a flow chart of Embodiment 3 of a parameter calibration method of a multi-line laser radar according to the present disclosure.

FIG. 3 is a flow chart of Embodiment 3 of a parameter calibration method of a multi-line laser radar according to the present disclosure. The parameter calibration method of the multi-line laser radar according to the present embodiment further introduces the technical solution of the present disclosure in more detail on the basis of the technical solution of the embodiment shown in FIG. 1. As shown in FIG. 3, the parameter calibration method of the multi-line laser radar of the present embodiment may specifically comprise the following steps:

300: creating a 3D scenario model of a calibration scenario, based on data of the calibration scenario collected by an already-calibrated 3D scanner;

301: obtaining point cloud data collected by the multi-line laser radar when a mounting machine mounted with a to-be-calibrated multi-line laser radar is respectively located at a plurality of position points in the calibration scenario;

The steps 300 and 301 of the present embodiment are implemented in the same way as steps 200 and 201 of the embodiment shown in FIG. 2. For particulars, please refer to relevant depictions of the embodiment shown in FIG. 2 and detailed depictions are not prevented any more here.

302: aligning respective position points to corresponding positions in the 3D scenario model;

303: obtaining a conversion parameter at respective position points after alignment from a coordinate system of the multi-line laser radar mounted on the mounting machine to a coordinate system of the 3D scenario model;

304: according to the conversion parameter at respective position points from the coordinate system of the multi-line laser radar mounted on the mounting machine to the coordinate system of the 3D scenario model, and an internal parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system;

Steps 302-304 of the present embodiment are a specific implementation mode of step 102 of the embodiment shown in FIG. 1. The step 302 is implemented in the same way as step 202 of the embodiment shown in FIG. 2. For particulars, please refer to relevant depictions of the above embodiment and detailed depictions are not prevented any more here.

The present embodiment differs from the embodiment shown in FIG. 2 as follows: in the present embodiment, not separately analyze the conversion parameter $T_{b,s}$ from the coordinate system of the multi-line laser radar to the coordinate system of the mounting machine, and the conversion parameter $T_{m,b}$ from the coordinate system of the mounting machine to the coordinate system of the 3D scenario model; but directly analyze the conversion parameter $T_{m,s}$ from the coordinate system of the multi-line laser radar to the coordinate system of the 3D scenario model. A conversion parameter $T_{m,s}^i$ corresponding to the $i^{th}$ position point from the coordinate system of the multi-line laser radar to the coordinate system of the 3D scenario model, and a conversion parameter set of the whole calibration scenario from the coordinate system of the multi-line laser radar to the coordinate system of the 3D scenario model may be represented as $T_{m,s} = \{T_{m,s}^i\}$, wherein $T_{m,s}^i = T_{m,b}^i T_{b,s}^i$, namely, $T_{m,s}^i$ corresponds to a product of the conversion parameter $T_{m,b}^i$ at the $i^{th}$ position point from the coordinate system of the mounting machine to the coordinate system of the 3D scenario model, and the conversion parameter $T_{b,s}^i$ at the $i^{th}$ position point from the coordinate system of the multi-line laser radar to the coordinate system of the mounting machine in the embodiment shown in FIG. 2.

The conversion parameters at respective position points from the coordinate system of the multi-line laser radar mounted on the mounting machine to the coordinate system of the 3D scenario model may specifically be determined by an actual position of an origin of coordinate of the coordinate system of the multi-line laser radar mounted on the mounting machine at each position point, and an actual position of an origin of coordinate of the coordinate system of the 3D scenario model.

For example, the step 304 may specifically comprise: taking $r_j$ as raw data at any point j in the point cloud collected by the multi-line laser radar at the $i^{th}$ position point, namely, the raw data at any point j in the point cloud collected by the mounted multi-line laser radar is $r_j$ when the mounting machine mounted with the multi-line laser radar is at the $i^{th}$ position point.

Then, calculating coordinates of the point j in the coordinate system of the 3D scenario model by using the equation $p_m^j = T_{m,s}^i L(r_j; I)$, according to the internal parameter I of the multi-line laser radar, and the conversion parameter at the corresponding position point from the coordinate system of the multi-line laser radar to the coordinate system of the 3D scenario model, wherein $r_j \in R_i$, $R_i$ is a set of raw data collected by the multi-line laser radar at the $i^{th}$ position; $L(r_j; I)$ is a conversion function from the raw data to the multi-line laser radar coordinate system; $T_{m,s}^i$ is a conversion parameter at the $i^{th}$ position point from the coordinate system of the multi-line laser radar to the coordinate system of the 3D scenario model; $p_m^j$ is coordinates of point j in the coordinate system of the 3D scenario model.

305: setting a weight $w(p) = f(c(p))$ and a normal direction $n(p)$ of points p in the 3D scenario model;

wherein c(p) is a scalar function, which measures a curve degree of a model surface adjacent to point p; function f( ) is a monotone function to mapc(p) to between 0 and 1; a value of w(p) is closer to 1 in a flatter region of the surface adjacent to the point p measured by c(p), otherwise the value of w(p) is closer to 0 in a more curved region of the surface adjacent to the point p measured by c(p); n(p) is the normal direction of the point p.

306: obtaining coordinates $m_j$ of a matching point nearest to coordinates $p_m^j$ of the point j in the 3D scenario model collected at the $i^{th}$ position point, and obtaining a weight $w(m_j)$ and a normal direction $n(m_j)$ of the matching point $m_j$;

Steps 305 and 306 may be implemented by respectively referring to specific implementations of steps 205 and 206 of the embodiment shown in FIG. 2, and will not be detailed any more here.

307: building a target function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,s}, I) = \Sigma_i \Sigma_j \rho(w(m_j) n^T(m_j)(m_j - p_m^j)), m_j \in M$$

where $E(T_{m,s}, I)$ is a target function; $\rho(\cdot)$ is a loss function; $n^T(m_j)$ is transposition of the normal direction $n(m_j)$ of the matching point $m_j$; M is a set of points in the 3D scenario model.

It needs to be appreciated that in the present embodiment, if it is impossible to accurately align the mounting machine and the 3D scenario model into the same coordinate system, whereupon optimizing the target function of the embodiment shown in the above FIG. 2 cannot accurately obtain real values of $T_{m,b}$, $T_{b,s}$ and I, but the internal parameter I of the multi-line laser radar may be optimized on the premise of constraining several parameters in the internal parameter I of the multi-line laser radar closely coupled to the external parameter $T_{m,b}$. For example, velodyne 64-line laser radar internal parameter model is taken as an example, and the internal parameters include a total of seven parameters: rotCorrection, vertCorrection, distCorrection, distCorrectionX, distCorrectionY, vertOffsetCorrection and horizOffsetCorrection. According to the technical solution of the present embodiment, it is necessary to constrain two parameters vertOffsetCorrection and horizOffsetCorrection.

In the application scenario of the present embodiment, it is possible to select the following manners to constrain these parameters:

Manner 1: not performing optimization and believing that an initial value provided by the manufacture is a real value;

Manner 2: using regularization technology to permit tiny changes to these parameters during optimization.

The conversion parameter $T_{m,s}$ in the target function $E(T_{m,s}, I)$ from the coordinate system of the multi-line laser radar to the coordinate system of the 3D scenario model corresponds to a product of the conversion parameter $T_{m,b}{}^i$ at the $i^{th}$ position point from the coordinate system of the mounting machine to the coordinate system of the 3D scenario model, and the conversion parameter $T_{b,s}{}^i$ at the $i^{th}$ position point from the coordinate system of the multi-line laser radar to the coordinate system of the mounting machine in the target function $E(T_{m,b}, T_{b,s}, I)$ in the embodiment shown in FIG. 2, namely, $T_{m,s}{}^i = T_{m,b}{}^i T_{b,s}{}^i$. All i $T_{m,s}{}^i$ are put together to obtain $T_{m,s}$, namely, $T_{m,s} = \{T_{m,s}{}^i\}$. In the application scenario of the present embodiment, it is possible, through the above changes, only calibrate partial parameters in the internal parameters. It is unnecessary to implement calibration of the external parameter.

Steps 305-307 in the present embodiment are a specific implementation mode of building the target function in step 103 of the embodiment shown in FIG. 1.

308: optimizing a conversion parameter $T_{m,s}$ in the target function from the coordinate system of the multi-line laser radar to the coordinate system of the 3D scenario model, to make the target function converge;

309: re-optimizing the internal parameter I in the target function to enable the target function to take a minimal value;

310: obtaining a value of the internal parameter I when the target function takes the minimal value, as the internal parameter after calibration of the multi-line laser radar.

Steps 308-310 of the present embodiment are a specific implementation mode of calibrating parameters of the multi-line laser radar in 104 of the embodiment shown in FIG. 1.

In the present embodiment, upon optimization, it is possible to employ an iterative optimization technology for optimization, for example, first optimize the conversion parameter $T_{m,s}$ from the coordinate system of the multi-line laser radar to the coordinate system of the 3D scenario model. Specifically, it is feasible to optimize i $T_{m,s}{}^i$ simultaneously and implement optimization of $T_{m,s}$ so that the target function converges; then, optimize the internal parameter I in the target function so that the target function takes a minimal value; obtain a value of the corresponding internal parameter I when the target function takes a minimal value, as the internal parameter after calibration of the multi-line laser radar.

According to the parameter calibration method of the multi-line laser radar of the present embodiment, as compared with the prior art, in the above technical solution, a complicated calibration scenario needn't be built, calibration of parameters of the multi-line laser radar can be achieved by randomly selecting a calibration scenario, thereby effectively improving the efficiency of calibrating parameters of the multi-line laser radar. Furthermore, the parameter calibration method of the multi-line laser radar of the present embodiment can effectively improve the precision of calibrating parameters of the multi-line laser radar, as compared with the current non-supervisory type calibration technology.

It needs to be appreciated that all variables represented with symbol T in the transformation parameters in the embodiments shown in FIG. 2 and FIG. 3 all are 4×4 rigid transform matrices. However, in fact there are only six freedom. During optimization, it is necessary to use local parameterization technology. The present disclosure is not limited to any type.

Furthermore, in the formulas in the embodiments shown in FIG. 2 and FIG. 3, points performing matrix multiplication with the transform parameters are all homogeneous coordinate expressions, and are ordinary 3D vectors in other cases.

Figure 4:
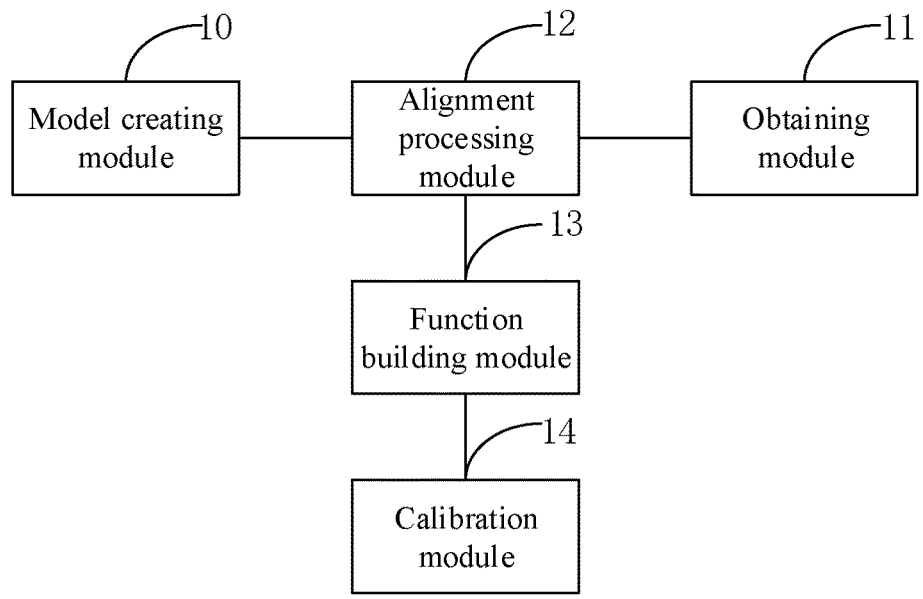
FIG. 4 is a structural diagram of an embodiment of a parameter calibration apparatus of a multi-line laser radar according to the present disclosure.

FIG. 4 is a structural diagram of an embodiment of a parameter calibration apparatus of a multi-line laser radar according to the present disclosure. As shown in FIG. 4, the parameter calibration apparatus of the multi-line laser radar according to the present embodiment may specifically comprise: a model creating module 10, an obtaining module 11, an alignment processing module 12, a function building module 13 and a calibration module 14.

The model creating module 10 is configured to create a 3D scenario model of a calibration scenario, based on data of the calibration scenario collected by an already-calibrated 3D scanner;

The obtaining module 11 is configured to obtain point cloud data collected by a to-be-calibrated multi-line laser radar at a plurality of position points in the calibration scenario respectively;

The alignment processing module 12 is configured to align the point cloud data collected by the multi-line laser radar at the respective point points obtained by the obtaining module 11 and point cloud data in the 3D scenario model created by the model creating module 10 into the same coordinate system on a principle that the respective position points are aligned with corresponding position points in the 3D scenario model;

The function building module 13 is configured to, based on the processing of the alignment processing module 12, build a target function between data of points collected by the multi-line laser radar and data of matching points nearest to the points in the 3D scenario model, under the same coordinate system;

The calibration module 14 is configured to calibrate the parameters of the multi-line laser radar according to the target function built by the function building module 13.

Principles employed by the parameter calibration apparatus of the multi-line laser radar according to the present embodiment to implement parameter calibration of the multi-line laser radar and the resultant technical effects are the same as those of the above-mentioned method embodiments. For particulars, please refer to the depictions of the aforesaid relevant method embodiments, and no detailed depictions will be presented here.

Further optionally, in the parameter calibration apparatus of the multi-line laser radar in the embodiment shown in FIG. 4, the alignment processing module 12 is specifically configured to:

align respective position points of the point cloud data collected by the multi-line laser radar obtained by the obtaining module 11 to corresponding positions in the 3D scenario model created by the model creating module 10;

obtain a conversion parameter at respective position points after the alignment from a coordinate system of the mounting machine mounted with the multi-line laser radar to a coordinate system of the 3D scenario model;

according to the conversion parameter at respective position points from the coordinate system of the mounting machine mounted with the multi-line laser radar to the coordinate system of the 3D scenario model, and an internal parameter and an external parameter of the multi-line laser radar, convert the point cloud data collected by the multi-line laser radar at respective position points to corresponding coordinates in the 3D scenario model, so that the point cloud data collected at respective position points and the 3D scenario model belong to the same coordinate system.

Further optionally, in the parameter calibration apparatus of the multi-line laser radar in the above embodiment, the alignment processing module 12 is specifically configured to:

take $r_j$ as raw data at any point j in the point cloud collected by the multi-line laser radar at the $i^{th}$ position point, and calculate coordinates of the point j in the coordinate system of the mounting machine by using the equation $p_b^j = T_{b,s} L(r_j; I)$, according to the internal parameter I of the multi-line laser radar, the conversion function for converting the raw data into the multi-line laser radar coordinate system, and the conversion parameter from the coordinate system of the multi-line laser radar to the coordinate system of the mounting machine mounted with the multi-line laser radar, wherein $r_j \in R_i$, $R_i$ is a set of raw data collected by the multi-line laser radar at the $i^{th}$ position; $L(r_j; I)$ is the conversion function from the raw data to the multi-line laser radar coordinate system; $T_{b,s}$ is a set of conversion parameters from the coordinate system of the multi-line laser radar to the coordinate system of the mounting machine mounted with the multi-line laser radar, $T_{b,s} = \{T_{b,s}^i\}$, wherein $T_{b,s}^i$, is the conversion parameter from the coordinate system of the $i^{th}$ multi-line laser radar to the coordinate system of the mounting machine mounted with the multi-line laser radar; $p_b^j$ is the coordinates of the point j in the coordinate system of the mounting machine;

calculate coordinates of the point j in the coordinate system of the 3D scenario model by using equation $p_m^j = T_{m,b}^i p_b^j$ according to a conversion parameter $T_{m,b}^i$ at the $i^{th}$ position point from the coordinate system of the mounting machine to the coordinate system of the 3D scenario model, and coordinates $p_b^j$ of the point j in the coordinate system of the mounting machine; wherein $p_m^j$ is coordinates of the point j in the coordinate system of the 3D scenario model.

Further optionally, in the parameter calibration apparatus of the multi-line laser radar in the above embodiment, the function building module 13 is specifically configured to:

set a weight $w(p) = f(c(p))$ and a normal direction $n(p)$ of points p in the 3D scenario model; wherein $c(p)$ is a scalar function, which measures a curve degree of a model surface adjacent to point p; function $f( )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtain coordinates $m_j$ of a matching point nearest to coordinates $p_m^j$ of the point j in the 3D scenario model collected at the $i^{th}$ position point, and obtain a weight $w(m_j)$ and a normal direction $n(m_j)$ of the matching point $m_j$;

build a target function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,b}, T_{b,s}, I) = \Sigma_i \Sigma_j \rho(w(m_j) n^T(m_j)(m_j - p_m^j)), m_j \in M$$

where $E(T_{m,b}, T_{b,s}, I)$ is a target function; $\rho(\cdot)$ is a loss function; $n^T(m_j)$ is transposition of the normal direction $n(m_j)$ of the matching point $m_j$; M is a set of points in the 3D scenario model; $T_{m,b} = \{T_{m,b}^i\}$ and is a set of conversion parameters $T_{m,b}^i$ of all i position points from the coordinate system of the mounting machine to the coordinate system of the 3D scenario model.

Further optionally, in the parameter calibration apparatus of the multi-line laser radar in the above embodiment, the calibration module 14 is specifically configured to:

optimize a conversion parameter $T_{b,s}$ in the target function from the coordinate system of the multi-line laser radar to the coordinate system of the mounting machine mounted with the multi-line laser radar, to make the target function converge;

jointly optimize the $T_{b,s}$ and internal parameter I in the target function to enable the target function to take a minimal value;

obtain a value of the corresponding $T_{b,s}$ and internal parameter I when the target function takes the minimal value, respectively as the external parameter and internal parameter after calibration of the multi-line laser radar.

Or further optionally, in the parameter calibration apparatus of the multi-line laser radar in the above embodiment, the alignment processing module 12 is specifically configured to:

align respective position points of point cloud data collected by the multi-line laser radar obtained by the obtaining module 11 to corresponding positions in the 3D scenario model created by the model creating module 10;

obtain a conversion parameter at respective position points after alignment from a coordinate system of the multi-line laser radar mounted on the mounting machine to a coordinate system of the 3D scenario model;

according to the conversion parameter at respective position points from the coordinate system of the multi-line laser radar mounted on the mounting machine to the coordinate system of the 3D scenario model, and an internal parameter of the multi-line laser radar, convert the point cloud data collected by the multi-line laser radar at respective position points to corresponding coordinates in the 3D scenario model, so that the point cloud data collected at respective position points and the 3D scenario model belong to the same coordinate system.

Further optionally, in the parameter calibration apparatus of the multi-line laser radar in the above embodiment, the alignment processing module 12 is specifically configured to:

take $r_j$ as raw data at any point j in the point cloud collected by the multi-line laser radar at the $i^{th}$ position point, and calculate coordinates of the point j in the coordinate system of the 3D scenario model by using the equation $p_m^j = T_{m,s}^i L(r_j; I)$, according to the internal parameter I of the multi-line laser radar, and the conversion parameter at the corresponding position point from the coordinate system of the mounted multi-line laser radar to the coordinate system of the 3D scenario model, wherein $r_j \in R_i$, $R_i$ is a set of raw data collected by the multi-line laser radar at the $i^{th}$ position; $L(r_j; I)$ is a conversion function from the raw data to the multi-line laser radar coordinate system; $T_{m,s}^i$ is a conversion parameter at the $i^{th}$ position point from the coordinate system of the multi-line laser radar to the coordinate system of the 3D scenario model; $p_m^j$ is coordinates of point j in the coordinate system of the 3D scenario model.

Further optionally, in the parameter calibration apparatus of the multi-line laser radar in the above embodiment, the function building module 13 is specifically configured to:

set a weight $w(p)=f(c(p))$ and a normal direction $n(p)$ of points p in the 3D scenario model, wherein $c(p)$ is a scalar function, which measures a curve degree of a model surface adjacent to point p; function $f( )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtain coordinates $m_j$ of a matching point nearest to coordinates $p_m^j$ of the point j in the 3D scenario model collected at the $i^{th}$ position point, and obtain a weight $w(m_j)$ and a normal direction $n(m_j)$ of the matching point $m_j$;

build a target function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,s}, I) = \Sigma_i \Sigma_j \rho(w(m_j) n^T(m_j)(m_j - p_m^j)), m_j \in M$$

where $E(T_{m,s}, I)$ is a target function; $\rho(\cdot)$ is a loss function; $n^T(m_j)$ is transposition of the normal direction $n(m_j)$ of the matching point $m_j$; M is a set of points in the 3D scenario model, $T_{m,s} = \{T_{m,s}^i\}$ is a set of conversion parameters at all i position points from the coordinate system of the mounted multi-line laser radar to the coordinate system of the 3D scenario model.

Further optionally, in the parameter calibration apparatus of the multi-line laser radar in the above embodiment, the calibration module 14 is specifically configured to:

optimize a conversion parameter $T_{m,s}$ in the target function from the coordinate system of the multi-line laser radar to the coordinate system of the 3D scenario model, to make the target function converge;

re-optimize the internal parameter I in the target function to enable the target function to take a minimal value;

obtain values of corresponding $T_{b,s}$ and internal parameter I when the target function takes the minimal value, as the internal parameter after calibration of the multi-line laser radar.

Principles employed by the parameter calibration apparatus of the multi-line laser radar according to the present embodiment to implement parameter calibration of the multi-line laser radar and the resultant technical effects are the same as those of the above-mentioned method embodiments. For particulars, please refer to the depictions of the aforesaid relevant method embodiments, and no detailed depictions will be presented here.

Figure 5:
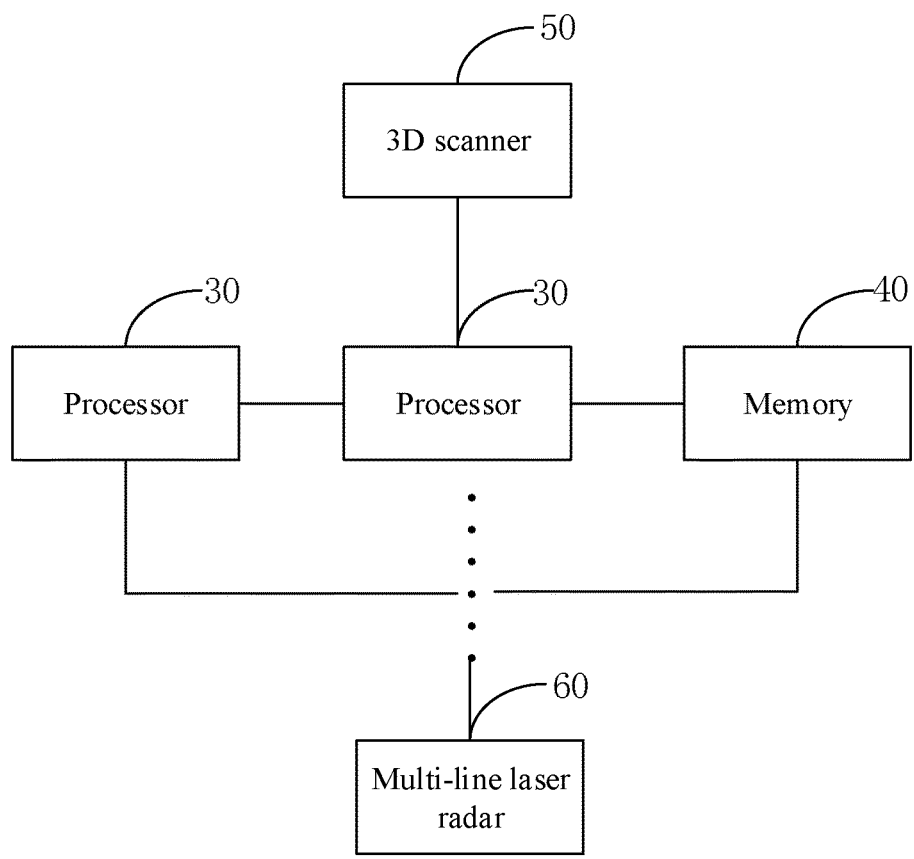
FIG. 5 is a structural diagram of an embodiment of a computer device according to the present disclosure.

FIG. 5 is a block diagram of an embodiment of a computer device according to the present disclosure. As shown in FIG. 5, the computer device according to the present embodiment comprises: one or more processors 30, a memory 40, a 3D scanner 50 and a multi-line lase radar 60, the memory 40 being used to store one or more programs. The 3D scanner 50 is used to collect data of the calibration scenario; the multi-line laser radar 60 is configured to collect point cloud data at a plurality of position points in the calibration scenario; the 3D scanner 50 and the multi-line laser radar 60 are mounted on the computer device and are respectively communicatively connected with the processor 30 to transmit the collected data to the processor 30.

The one or more programs stored in the memory 40, when executed by said one or more processors 30, enable said one or more processors 30 to implement the parameter calibration method of the multi-line laser radar shown in FIG. 1-FIG. 3. The embodiment shown in FIG. 5 takes an example in which there are a plurality of processors 30.

Figure 6:
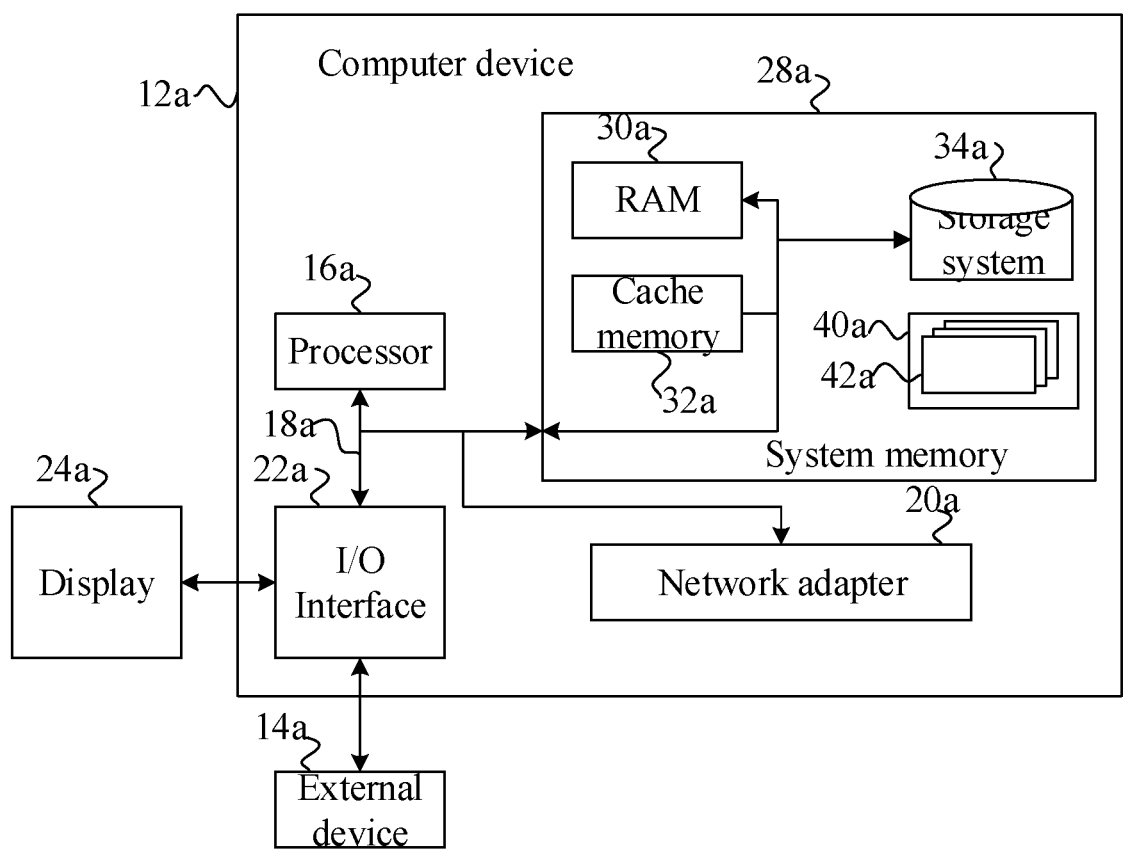
FIG. 6 is an example diagram of a computer device according to the present disclosure.

For example, FIG. 6 is an example diagram of a computer device according to an embodiment of the present disclosure. FIG. 6 shows a block diagram of an example computer device 12a adapted to implement an implementation mode of the present disclosure. The computer device 12a shown in FIG. 6 is only an example and should not bring about any limitation to the function and scope of use of the embodiments of the present disclosure. In the present embodiment, the computer device shown in FIG. 7 only shows hardware portions for processing the parameter calibration method of the multi-line laser radar in the embodiments shown in FIG. 1-FIG. 3, and does not show the 3D scanner 50 and multi-line laser radar 60 in the embodiment shown in FIG. 6.

As shown in FIG. 6, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 6, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the parameter calibration method of the multi-level laser radar as shown in the above embodiments.

The present disclosure further provides a computer readable medium on which a computer program is stored, the program, when executed by a processor, implementing the parameter calibration method of the multi-level laser radar shown in the above embodiments.

The computer readable medium of the present embodiment may include RAM 30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of calibration of internal and/or external parameters of a multi-line laser radar in view of different calibration scenario, the external parameters being related to both the multi-line laser radar and a mounting machine mounted with the multi-line laser radar, wherein the method comprises:

creating a 3D scenario model of a calibration scenario, based on data of the calibration scenario collected by an already-calibrated 3D scanner;

obtaining point cloud data collected by a to-be-calibrated multi-line laser radar at a plurality of position points in the calibration scenario respectively, wherein a precision of the already-calibrated 3D scanner is larger than the precision of the to-be-calibrated multi-line laser radar;

aligning absolutely the point cloud data collected by the multi-line laser radar at the respective point points and point cloud data in the 3D scenario model into the same coordinate system on a principle that the respective position points are aligned with corresponding position points in the 3D scenario model;

building an objective function between data of points collected by the multi-line laser radar and data of matching points which are nearest to the respective points collected by the multi-line laser radar in the 3D scenario model under the same coordinate system, wherein the objective function defines a point-to-point correspondence between a point collected by the multi-line laser radar and a corresponding matching point in the 3D scenario model;

calibrating the parameters of the multi-line laser radar according to the objective function.

2. The method according to claim 1, wherein the aligning the point cloud data collected by the multi-line laser radar at the respective point points and point cloud data in the 3D scenario model into the same coordinate system on a principle that the respective position points are aligned with corresponding position points in the 3D scenario model specifically comprises:

aligning respective position points to corresponding positions in the 3D scenario model;

obtaining a conversion parameter at respective position points after the alignment from a coordinate system of a mounting machine mounted with the multi-line laser radar to a coordinate system of the 3D scenario model;

according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

3. The method according to claim 2, wherein the step of, according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model specifically comprises:

taking $r_j$ as raw data at any point j in the point cloud collected by the multi-line laser radar at the $i^{th}$ position point, and calculating coordinates of the point j in the coordinate system of the mounting machine by using the equation $p_b^j = T_{b,s} L(r_j; I)$, according to the internal parameter I of the multi-line laser radar, the conversion function for converting the raw data into the multi-line laser radar coordinate system, and the conversion parameter from the coordinate system of the multi-line laser radar to the coordinate system of the mounting machine mounted with the multi-line laser radar, wherein $r_j \in R_i$, $R_i$ is a set of raw data collected by the multi-line laser radar at the $i^{th}$ position; $L(r_j; I)$ is the conversion function from the raw data to the multi-line laser radar coordinate system; $T_{b,s}$ is a set of conversion parameters from the coordinate system of the multi-line laser radar to the coordinate system of the mounting machine mounted with the multi-line laser radar, $T_{b,s} = \{T_{b,s}^i\}$, wherein $T_{b,s}^i$ is the conversion parameter from the coordinate system of the $i^{th}$ multi-line laser radar to the coordinate system of the mounting machine mounted with the multi-line laser radar; $p_b^j$ is the coordinates of the point j in the coordinate system of the mounting machine;

calculating coordinates of the point j in the coordinate system of the 3D scenario model by using equation $p_m^j = T_{m,b}^i p_b^j$ according to a conversion parameter $T_{m,b}^i$ at the $i^{th}$ position point from the coordinate system of the mounting machine to the coordinate system of the 3D scenario model, and coordinates $p_b^j$ of the point j in the coordinate system of the mounting machine; wherein $p_m^j$ is coordinates of the point j in the coordinate system of the 3D scenario model.

4. The method according to claim 3, wherein the building an objective function between data of points collected by the multi-line laser radar and data of matching points nearest to the points in the 3D scenario model, under the same coordinate system specifically comprises:

setting a weight $w(p) = f(c(p))$ and a normal direction $n(p)$ of points p in the 3D scenario model; wherein $c(p)$ is a scalar function, which measures a curve degree of a model surface adjacent to point p; function $f(\ )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtaining coordinates $m_j$ of a matching point nearest to coordinates $p_m^j$ of the point j in the 3D scenario model collected at the $i^{th}$ position point, and obtaining a weight $w(m_j)$ and a normal direction $n(m_j)$ of the matching point $m_j$;

building an objective function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,b},T_{b,s},I)=\Sigma_i\Sigma_j\rho(w(m_j)n^T(m_j)(m_j-p_m^j)), m_j\in M$$

where $E(T_{m,b},T_{b,s}, I)$ is an objective function; $\rho(\cdot)$ is a loss function; $n^T(m_j)$ is transposition of the normal direction $n(m_j)$ of the matching point $m_j$; M is a set of points in the 3D scenario model; $T_{m,b}=\{T_{m,b}^i\}$ and is a set of conversion parameters $T_{m,b}^i$ of all i position points from the coordinate system of the mounting machine to the coordinate system of the 3D scenario model.

5. The method according to claim 4, wherein the calibrating the parameters of the multi-line laser radar according to the objective function specifically comprises:

optimizing a conversion parameter $T_{b,s}$ in the objective function from the coordinate system of the multi-line laser radar to the coordinate system of the mounting machine mounted with the multi-line laser radar, to make the objective function converge;

jointly optimizing the $T_{b,s}$ and internal parameter I in the objective function to enable the objective function to take a minimal value;

obtaining a value of the corresponding $T_{b,s}$ and internal parameter I when the objective function takes the minimal value, respectively as the external parameter and internal parameter after calibration of the multi-line laser radar.

6. The method according to claim 1, wherein the aligning the point cloud data collected by the multi-line laser radar at the respective point points and point cloud data in the 3D scenario model into the same coordinate system on a principle that the respective position points are aligned with corresponding position points in the 3D scenario model specifically comprises:

aligning respective position points to corresponding positions in the 3D scenario model;

obtaining a conversion parameter at respective position points after alignment from a coordinate system of the multi-line laser radar mounted on a mounting machine to a coordinate system of the 3D scenario model;

according to the conversion parameter at respective position points from the coordinate system of the multi-line laser radar mounted on the mounting machine to the coordinate system of the 3D scenario model, and an internal parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

7. The method according to claim 6, wherein the step of, according to the conversion parameter at respective position points from the coordinate system of the mounted multi-line laser radar to the coordinate system of the 3D scenario model, and an internal parameter of the multi-line laser radar, converting the point cloud data collected by the multi-line laser radar at respective position points to corresponding coordinates in the 3D scenario model specifically comprises:

taking $r_j$ as raw data at any point j in the point cloud collected by the multi-line laser radar at the $i^{th}$ position point, and calculating coordinates of the point j in the coordinate system of the 3D scenario model by using the equation $p_m^j=T_{m,s}^i L(r_j; I)$, according to the internal parameter I of the multi-line laser radar, and the conversion parameter at the corresponding position point from the coordinate system of the mounted multi-line laser radar to the coordinate system of the 3D scenario model, wherein $r_j\in R_i$, $R_i$ is a set of raw data collected by the multi-line laser radar at the $i^{th}$ position; $L(r_j; I)$ is a conversion function from the raw data to the multi-line laser radar coordinate system; $T_{m,s}^i$ is a conversion parameter at the $i^{th}$ position point from the coordinate system of the multi-line laser radar to the coordinate system of the 3D scenario model; $p_m^j$ is coordinates of point j in the coordinate system of the 3D scenario model.

8. The method according to claim 7, wherein the building an objective function between data of points collected by the multi-line laser radar and data of matching points nearest to the points in the 3D scenario model, under the same coordinate system specifically comprises:

setting a weight $w(p)=f(c(p))$ and a normal direction $n(p)$ of points p in the 3D scenario model, wherein $c(p)$ is a scalar function, which measures a curve degree of a model surface adjacent to point p; function $f(\ )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;

obtaining coordinates $m_j$ of a matching point nearest to coordinates $p_m^j$ of the point j in the 3D scenario model collected at the $i^{th}$ position point, and obtain a weight $w(m_j)$ and a normal direction $n(m_j)$ of the matching point $m_j$;

building an objective function using the following formula according to the coordinates $p_m^j$ of the point j in the coordinate system of the 3D scenario model, the coordinates of the matching point, and the weight $w(m_j)$ and the normal direction $n(m_j)$ of the matching point $m_j$:

$$E(T_{m,s},I)=\Sigma_i\Sigma_j\rho(w(m_j)n^T(m_j)(m_j-p_m^j)), m_j\in M$$

where $E(T_{m,s}, I)$ is an objective function; $\rho(\cdot)$ is a loss function; $n^T(m_j)$ is transposition of the normal direction $n(m_j)$ of the matching point $m_j$; M is a set of points in the 3D scenario model, $T_{m,s}=\{T_{m,s}^i\}$ is a set of conversion parameters at all i position points from the coordinate system of the mounted multi-line laser radar to the coordinate system of the 3D scenario model.

9. The method according to claim 8, wherein the calibrating the parameters of the multi-line laser radar according to the objective function specifically comprises:

optimizing a conversion parameter $T_{m,s}$ in the objective function from the coordinate system of the multi-line laser radar to the coordinate system of the 3D scenario model, to make the objective function converge;

re-optimizing the internal parameter I in the objective function to enable the objective function to take a minimal value;

obtaining values of corresponding $T_{b,s}$ and internal parameter I when the objective function takes the minimal value, as the internal parameter after calibration of the multi-line laser radar.

10. A computer device, where the device comprises:
one or more processors,
a storage for storing one or more programs,
a multi-line laser radar is configured to collect point cloud data at a plurality of position points in the calibration scenario; the 3D scanner and the multi-line laser radar are respectively communicatively connected with the processor to transmit the collected data to the processor;
the one or more programs, when executed by said one or more processors, enable said one or more processors to implement a method of calibration of internal and/or external parameters of a multi-line laser radar in view of different calibration scenario, the external parameters being related to both the multi-line laser radar and a mounting machine mounted with the multi-line laser radar, wherein the method comprises:
creating a 3D scenario model of a calibration scenario, based on data of the calibration scenario collected by an already-calibrated 3D scanner;
obtaining point cloud data collected by a to-be-calibrated multi-line laser radar at a plurality of position points in the calibration scenario respectively, wherein a precision of the already-calibrated 3D scanner is larger than the precision of the to-be-calibrated multi-line laser radar;
aligning absolutely the point cloud data collected by the multi-line laser radar at the respective point points and point cloud data in the 3D scenario model into the same coordinate system on a principle that the respective position points are aligned with corresponding position points in the 3D scenario model;
building an objective function between data of points collected by the multi-line laser radar and data of matching points which are nearest to the respective points collected by the multi-line laser radar in the 3D scenario model under the same coordinate system, wherein the objective function defines a point-to-point correspondence between a point collected by the multi-line laser radar and a corresponding matching point in the 3D scenario model;
calibrating the parameters of the multi-line laser radar according to the objective function.

11. The computer device according to claim 10, wherein the aligning the point cloud data collected by the multi-line laser radar at the respective point points and point cloud data in the 3D scenario model into the same coordinate system on a principle that the respective position points are aligned with corresponding position points in the 3D scenario model specifically comprises:
aligning respective position points to corresponding positions in the 3D scenario model;
obtaining a conversion parameter at respective position points after the alignment from a coordinate system of a mounting machine mounted with the multi-line laser radar to a coordinate system of the 3D scenario model;
according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

12. The computer device according to claim 11, wherein the step of, according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model specifically comprises:
taking $r_j$ as raw data at any point j in the point cloud collected by the multi-line laser radar at the $i^{th}$ position point, and calculating coordinates of the point j in the coordinate system of the mounting machine by using the equation $p_b^j = T_{b,s} L(r_j; I)$, according to the internal parameter I of the multi-line laser radar, the conversion function for converting the raw data into the multi-line laser radar coordinate system, and the conversion parameter from the coordinate system of the multi-line laser radar to the coordinate system of the mounting machine mounted with the multi-line laser radar, wherein $r_j \in R_i$, $R_i$ is a set of raw data collected by the multi-line laser radar at the $i^{th}$ position; $L(r_j; I)$ is the conversion function from the raw data to the multi-line laser radar coordinate system; $T_{b,s}$ is a set of conversion parameters from the coordinate system of the multi-line laser radar to the coordinate system of the mounting machine mounted with the multi-line laser radar, $T_{b,s} = \{T_{b,s}^i\}$, wherein $T_{b,s}^i$ is the conversion parameter from the coordinate system of the $i^{th}$ multi-line laser radar to the coordinate system of the mounting machine mounted with the multi-line laser radar; $p_b^j$ is the coordinates of the point j in the coordinate system of the mounting machine;
calculating coordinates of the point j in the coordinate system of the 3D scenario model by using equation $p_m^j = T_{m,b}^i p_b^j$ according to a conversion parameter $T_{m,b}^i$ at the $i^{th}$ position point from the coordinate system of the mounting machine to the coordinate system of the 3D scenario model, and coordinates $p_b^j$ of the point j in the coordinate system of the mounting machine; wherein $p_m^j$ is coordinates of the point j in the coordinate system of the 3D scenario model.

13. The computer device according to claim 12, wherein the building an objective function between data of points collected by the multi-line laser radar and data of matching points nearest to the points in the 3D scenario model, under the same coordinate system specifically comprises:
setting a weight $w(p) = f(c(p))$ and a normal direction $n(p)$ of points p in the 3D scenario model; wherein $c(p)$ is a scalar function, which measures a curve degree of a model surface adjacent to point p; function $f(\ )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;
obtaining coordinates $m_j$ of a matching point nearest to coordinates $p_m^j$ of the point j in the 3D scenario model collected at the $i^{th}$ position point, and obtaining a weight $w(m_j)$ and a normal direction $n(m_j)$ of the matching point $m_j$;
building an objective function using the following formula according to the coordinates $p_m^j$ of the point j in the coordinate system of the 3D scenario model, the coordinates m_j of the matching point, and the weight w(m_j) and the normal direction n(m_j) of the matching point m_j:

$$E(T_{m,b}, T_{b,s}, I) = \Sigma_i \Sigma_j \rho(w(m_j) n^T(m_j)(m_j - p_m^j)), m_j \in M$$

where $E(T_{m,b}, T_{b,s}, I)$ is an objective function; $\rho(\cdot)$ is a loss function; $n^T(m_j)$ is transposition of the normal direction $n(m_j)$ of the matching point $m_j$; M is a set of points in the 3D scenario model; $T_{m,b} = \{T_{m,b}^i\}$ and is a set of conversion parameters $T_{m,b}^i$ of all i position points from the coordinate system of the mounting machine to the coordinate system of the 3D scenario model.

14. The computer device according to claim 13, wherein the calibrating the parameters of the multi-line laser radar according to the objective function specifically comprises:
   optimizing a conversion parameter $T_{b,s}$ in the objective function from the coordinate system of the multi-line laser radar to the coordinate system of the mounting machine mounted with the multi-line laser radar, to make the objective function converge;
   jointly optimizing the $T_{b,s}$ and internal parameter I in the objective function to enable the objective function to take a minimal value;
   obtaining a value of the corresponding $T_{b,s}$ and internal parameter I when the objective function takes the minimal value, respectively as the external parameter and internal parameter after calibration of the multi-line laser radar.

15. The computer device according to claim 10, wherein the aligning the point cloud data collected by the multi-line laser radar at the respective point points and point cloud data in the 3D scenario model into the same coordinate system on a principle that the respective position points are aligned with corresponding position points in the 3D scenario model specifically comprises:
   aligning respective position points to corresponding positions in the 3D scenario model;
   obtaining a conversion parameter at respective position points after alignment from a coordinate system of the multi-line laser radar mounted on a mounting machine to a coordinate system of the 3D scenario model;
   according to the conversion parameter at respective position points from the coordinate system of the multi-line laser radar mounted on the mounting machine to the coordinate system of the 3D scenario model, and an internal parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

16. The computer device according to claim 15, wherein the step of, according to the conversion parameter at respective position points from the coordinate system of the mounted multi-line laser radar to the coordinate system of the 3D scenario model, and an internal parameter of the multi-line laser radar, converting the point cloud data collected by the multi-line laser radar at respective position points to corresponding coordinates in the 3D scenario model specifically comprises:
   taking $r_j$ as raw data at any point j in the point cloud collected by the multi-line laser radar at the $i^{th}$ position point, and calculating coordinates of the point j in the coordinate system of the 3D scenario model by using the equation $p_m^j = T_{m,s}^i L(r_j; I)$, according to the internal parameter I of the multi-line laser radar, and the conversion parameter at the corresponding position point from the coordinate system of the mounted multi-line laser radar to the coordinate system of the 3D scenario model, wherein $r_j \in R_i$, $R_i$ is a set of raw data collected by the multi-line laser radar at the $i^{th}$ position; $L(r_j; I)$ is a conversion function from the raw data to the multi-line laser radar coordinate system; $T_{m,s}^i$ is a conversion parameter at the $i^{th}$ position point from the coordinate system of the multi-line laser radar to the coordinate system of the 3D scenario model; $p_m^j$ is coordinates of point j in the coordinate system of the 3D scenario model.

17. The computer device according to claim 16, wherein the building an objective function between data of points collected by the multi-line laser radar and data of matching points nearest to the points in the 3D scenario model, under the same coordinate system specifically comprises:
   setting a weight $w(p) = f(c(p))$ and a normal direction $n(p)$ of points p in the 3D scenario model, wherein $c(p)$ is a scalar function, which measures a curve degree of a model surface adjacent to point p; function $f(\ )$ is a monotone function to map $c(p)$ to between 0 and 1; a value of $w(p)$ is closer to 1 in a flatter region of the surface adjacent to the point p measured by $c(p)$, otherwise the value of $w(p)$ is closer to 0 in a more curved region of the surface adjacent to the point p measured by $c(p)$; $n(p)$ is the normal direction of the point p;
   obtaining coordinates $m_j$ of a matching point nearest to coordinates $p_m^j$ of the point j in the 3D scenario model collected at the $i^{th}$ position point, and obtain a weight $w(m_j)$ and a normal direction $n(m_j)$ of the matching point $m_j$;
   building an objective function using the following formula according to the coordinates $p_m^j$ of the point j in the coordinate system of the 3D scenario model, the coordinates $m_j$ of the matching point, and the weight $w(m_j)$ and the normal direction $n(m_j)$ of the matching point $m_j$:

$$E(T_{m,s}, I) = \Sigma_i \Sigma_j \rho(w(m_j) n^T(m_j)(m_j - p_m^j)), m_j \in M$$

where $E(T_{m,s}, I)$ is an objective function; $\rho(\cdot)$ is a loss function; $n^T(m_j)$ is transposition of the normal direction $n(m_j)$ of the matching point $m_j$; M is a set of points in the 3D scenario model, $T_{m,s} = \{T_{m,s}^i\}$ is a set of conversion parameters at all i position points from the coordinate system of the mounted multi-line laser radar to the coordinate system of the 3D scenario model.

18. The computer device according to claim 17, wherein the calibrating the parameters of the multi-line laser radar according to the objective function specifically comprises:
   optimizing a conversion parameter $T_{m,s}$ in the objective function from the coordinate system of the multi-line laser radar to the coordinate system of the 3D scenario model, to make the objective function converge;
   re-optimizing the internal parameter I in the objective function to enable the objective function to take a minimal value;
   obtaining values of corresponding $T_{b,s}$ and internal parameter I when the objective function takes the minimal value, as the internal parameter after calibration of the multi-line laser radar.

19. A non-transitory computer readable medium on which a computer program is stored, wherein the program, when executed by a processor, implements a method of calibration of internal and/or external parameters of a multi-line laser radar in view of different calibration scenario, the external parameters being related to both the multi-line laser radar and a mounting machine mounted with the multi-line laser radar, wherein the method comprises:

creating a 3D scenario model of a calibration scenario, based on data of the calibration scenario collected by an already-calibrated 3D scanner;

obtaining point cloud data collected by a to-be-calibrated multi-line laser radar at a plurality of position points in the calibration scenario respectively, wherein a precision of the already-calibrated 3D scanner is larger than the precision of the to-be-calibrated multi-line laser radar;

aligning absolutely the point cloud data collected by the multi-line laser radar at the respective point points and point cloud data in the 3D scenario model into the same coordinate system on a principle that the respective position points are aligned with corresponding position points in the 3D scenario model;

building an objective function between data of points collected by the multi-line laser radar and data of matching points which are nearest to the respective points collected by the multi-line laser radar in the 3D scenario model under the same coordinate system, wherein the objective function defines a point-to-point correspondence between a point collected by the multi-line laser radar and a corresponding matching point in the 3D scenario model;

calibrating the parameters of the multi-line laser radar according to the objective function.

20. The non-transitory computer readable medium according to claim 19, wherein the aligning the point cloud data collected by the multi-line laser radar at the respective point points and point cloud data in the 3D scenario model into the same coordinate system on a principle that the respective position points are aligned with corresponding position points in the 3D scenario model specifically comprises:

aligning respective position points to corresponding positions in the 3D scenario model;

obtaining a conversion parameter at respective position points after the alignment from a coordinate system of a mounting machine mounted with the multi-line laser radar to a coordinate system of the 3D scenario model;

according to the conversion parameter at respective position points from the coordinate system of the mounting machine mounted with the multi-line laser radar to the coordinate system of the 3D scenario model, and an internal parameter and an external parameter of the multi-line laser radar, converting the point cloud data collected by the multi-line laser radar at respective position points to corresponding coordinates in the 3D scenario model, so that the point cloud data collected at respective position points and the 3D scenario model belong to the same coordinate system.

* * * * *